(12) United States Patent
Pusic

(10) Patent No.: US 6,361,461 B1
(45) Date of Patent: Mar. 26, 2002

(54) MULTIPLE-SPEED CHAIN DRIVING DEVICE

(76) Inventor: Pavo Pusic, 52 Brooklake Rd., Florham Park, NJ (US) 07932

( * ) Notice: Subject to any disclaimer, the term of this patent is extended or adjusted under 35 U.S.C. 154(b) by 0 days.

(21) Appl. No.: 09/537,267

(22) Filed: Mar. 29, 2000

(51) Int. Cl.[7] .......................... F16H 55/30; F16H 55/12; F16D 23/00
(52) U.S. Cl. ....................... 474/152; 474/158; 474/162; 192/64
(58) Field of Search ................................ 474/152, 156, 474/158, 160, 161, 159, 163, 166, 171, 153; 475/162, 170; 192/64, 45, 46, 48.92

(56) References Cited

U.S. PATENT DOCUMENTS

| | | | | |
|---|---|---|---|---|
| 1,836,602 A | * | 12/1931 | King | .......................... 475/162 |
| 2,932,207 A | * | 4/1960 | Whitney | ...................... 474/152 |
| 3,162,057 A | * | 12/1964 | Burrell | ........................ 474/152 |
| 3,541,871 A | * | 11/1970 | Burrell | .................... 474/152 X |
| 4,559,028 A | * | 12/1985 | Reeves, Jr. | ............. 474/152 X |
| 5,030,184 A | * | 7/1991 | Rennerfelt | ................... 475/162 |
| 5,980,406 A | * | 11/1999 | Mott et al. | .............. 474/152 X |

* cited by examiner

Primary Examiner—David A. Bucci
Assistant Examiner—Marcus Charles

(57) ABSTRACT

A multiple-speed chain driving device includes a shaft, a rotors' assembly, a chain driving sprocket, and a shifting assembly. The rotors' assembly is mounted on the shaft and includes three rotors which are vertically mounted on each other and enclosed within the sprocket. The shifting assembly is also mounted on the shaft and located parallel with respect to the rotors' assembly. The device can be made in either 3-speed or 2-speed design and enables a few slightly different configurations for both designs. The device enables a smooth shifting process and allows only one sprocket to produce the full range of speeds presently obtained by a front sprocket assembly in a bicycle.

20 Claims, 22 Drawing Sheets

MULTIPLE-SPEED CHAIN DRIVING DEVICE

BACKGROUND OF THE INVENTION

A front set of chain sprockets used in a bicycle comprises two or three chain sprockets which drive a chain that further transmits pedaling power to chain sprockets mounted on an axle in a rear bicycle wheel. Since each of the front sprockets has a different number of teeth, they enable different rotating speeds of the rear sprockets and thereby provide different bicycle driving speeds. In order to change driving ratios the chain has to be replaced from one sprocket to another by a derailleur which is mounted proximate to the front chain sprockets.

The sprockets have significantly different diameters which, in turn, makes the chain replacement relatively abrupt and difficult. Even the most sophisticated derailleurs cannot provide smooth shifting and eliminate the related stress and power loss. Every time the chain is displaced from one sprocket and mounted on another sprocket it causes an interruption of power flow and related loss of pedaling power.

SUMMARY OF THE INVENTION

It is an object of the present invention to provide a device which will enable an uninterrupted flow of pedaling power from a crankshaft to a drive chain of a bicycle or similar pedal propelled vehicles. The present invention comprises a rotor assembly wherein three members are provided within the front chain sprocket of the bicycle and mounted in a manner which enables all of them to work in concert with each other. An inner rotor is located within a middle rotor and the middle rotor is located within an outer rotor. The inner rotor has a certain number of lobes while the inner opening of the middle rotor has a certain higher number of pockets which receive the lobes during the rotation. The middle rotor also has a certain number of lobes on its outer circumference while the outer rotor's inner opening has a certain higher number of pockets which receive the lobes of the middle rotor.

The inner rotor and the outer rotor rotate around the same axis while the middle rotor rotates around a different axis. This enables the middle rotor to rotate eccentrically with respect to the inner and outer rotors which, in turn, enables the middle rotor to transfer the rotating force between the inner and outer rotors. The inner and outer rotor rotate around the same axis as the front chain sprocket which rotates around the outer rotor. An overrunning clutch connects the inner rotor to the bicycle crankshaft and this rotor serves as a power input member during the slowest speed. The inner rotor is also directly connected to the chain sprocket by mechanical means to serve as the power transfer member during the fastest speed, as explained later in this specification. The outer rotor is by mechanical means also connected to the bicycle crankshaft and serves as an input member during the $2^{nd}$ and $3^{rd}$ speed.

According to the process of the invention, when the inner rotor is pushed by the rotational force of the crankshaft, its lobes exert force onto the pockets inside the middle rotor and force the middle rotor to rotate in the same direction but at a slower speed. Further, the middle rotor's lobes force the outer rotor to rotate in the same direction at a lower speed. The rotating force of the outer rotor is over an overrunning clutch further transmitted onto the chain sprocket. Since the inner rotor has less lobes than the pockets in the middle rotor and the middle rotor has less lobes than the pockets in the outer rotor, the outer rotor rotates at the rate defined by the difference between the lobes and the pockets in all rotors. The rotating speed of the outer rotor is slower than the rotating speed of both other rotors and this speed of the outer rotor corresponds to the slowest possible rotating speed, hereinafter referred to as the "$1^{st}$ speed".

When the outer rotor is connected to the crankshaft, the overrunning clutch which connects the inner rotor to the crankshaft is disconnected and the sprocket is (over the overrunning clutch) forced to rotate at the speed of the outer rotor which equals the rotating speed of the crankshaft. The obtained rotating speed is faster and hereinafter referred to as the "$2^{nd}$ speed". During the time when the outer rotor is firmly connected to the crankshaft, the inner rotor rotates at a faster rate with respect to the outer rotor. When the inner rotor is directly connected to the sprocket while the outer rotor is connected to the crankshaft, the rotating speed of the sprocket equals the rotating speed of the inner rotor and the sprocket is forced to rotate at the fastest possible rate, hereinafter referred to as the "$3^{rd}$ speed".

The present invention provides a few different versions of a speed changing device which can be used on bicycles or similar pedal-propelled vehicles. The versions presented in this specification include these which provide 3 output speeds and these which provide 2 output speeds. All versions operate apply the same operating principles wherein the change in output rotating speeds is obtained by alternately providing different connections between the crankshaft, rotors, and chain sprocket and wherein the different number of the rotors' lobes and pockets results in different rotating ratios of the rotors. The features and advantages of the present invention will become apparent from the following brief description of the drawings and a detailed description of the invention.

DETAILED DESCRIPTION OF THE PREFERRED EMBODIMENT

Figure 1:
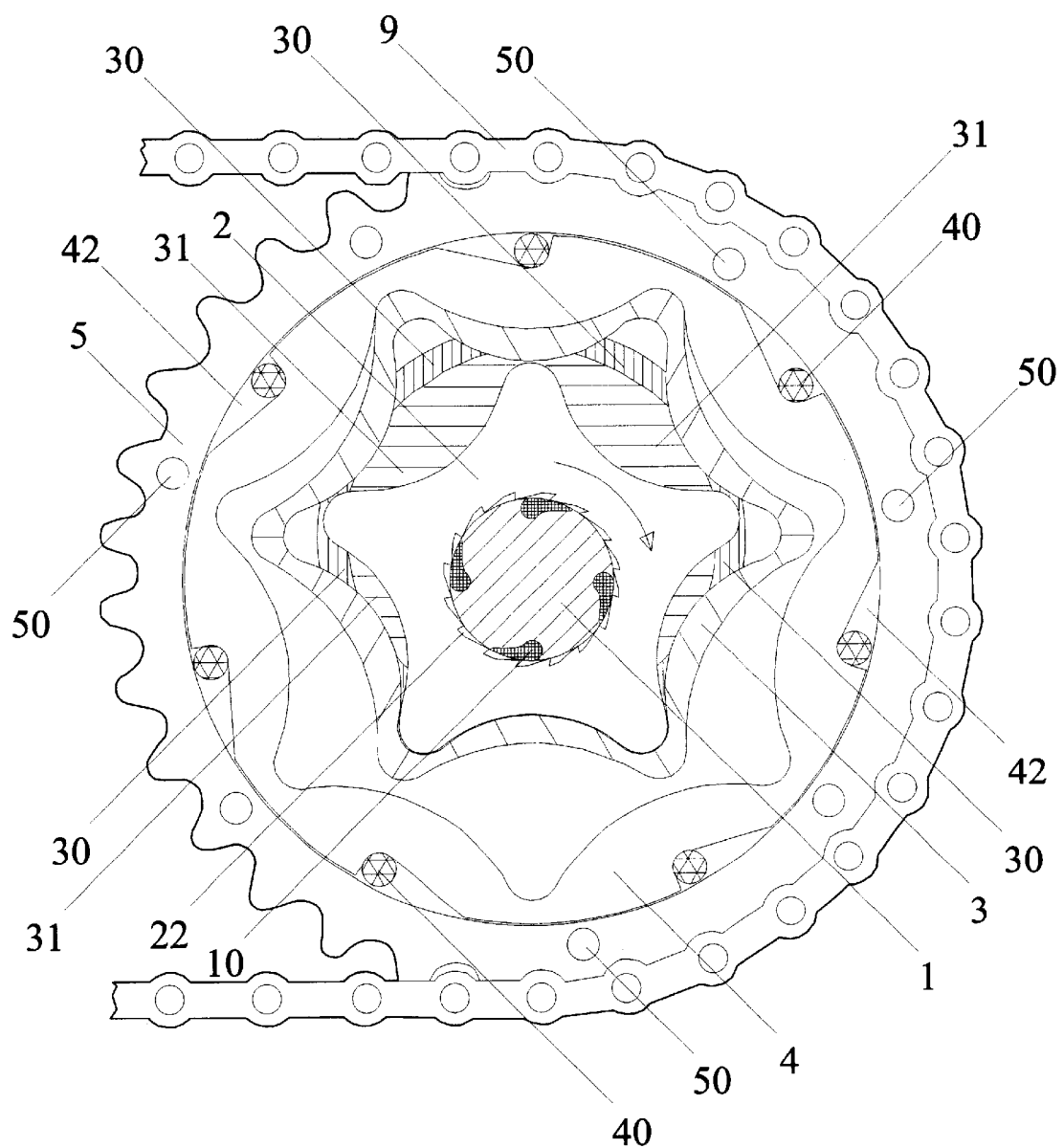
FIG. 1 is a side cut-away view of the rotors' assembly showing the rotors' and sprocket arrangement for the 3-speed version of the invention wherein the free-wheel clutch is used to connect the shaft and the inner rotor and the overrunning clutch is used to connect the outer rotor and the sprocket.
Figure 2:
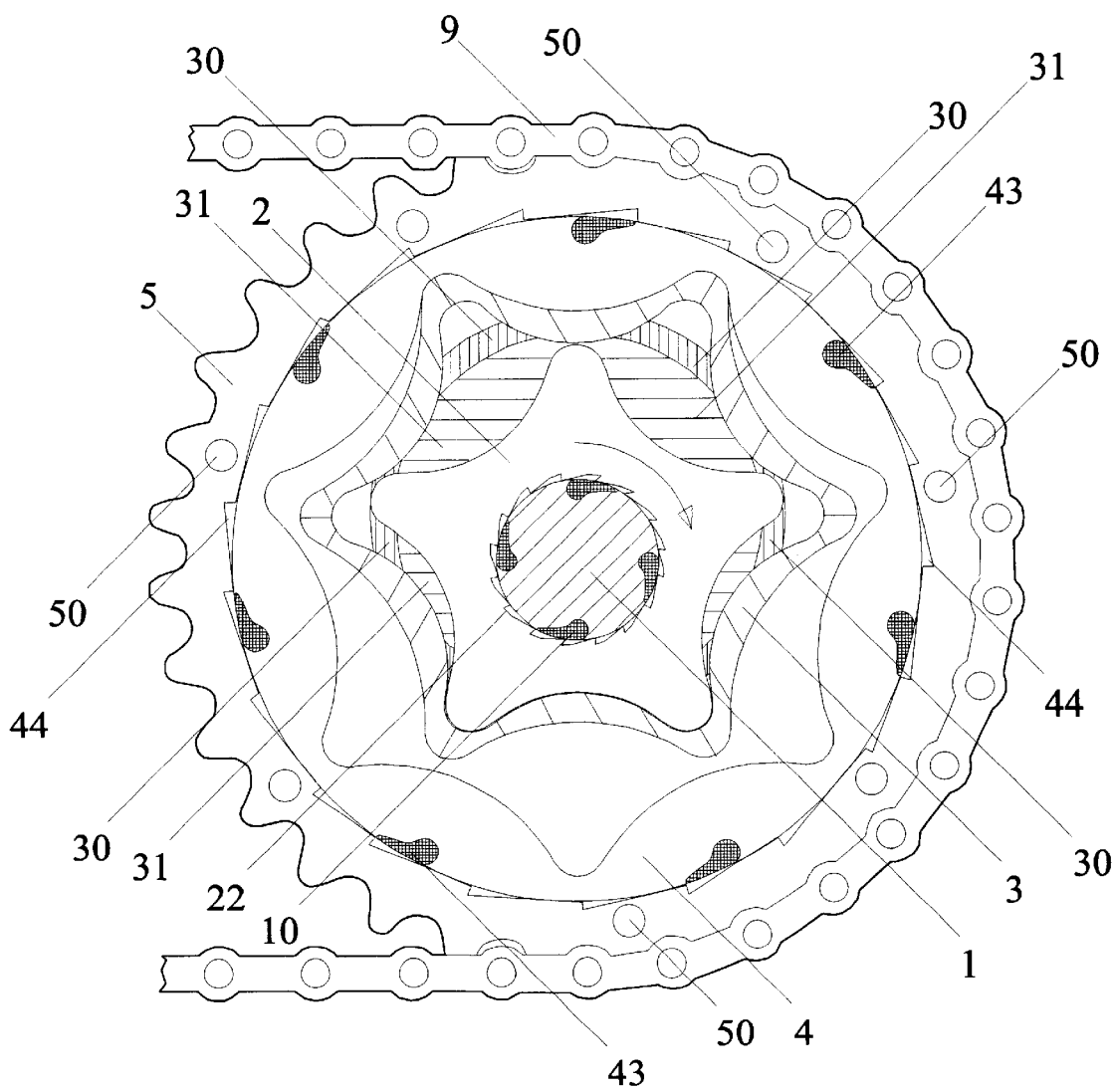
FIG. 2 is a side cut-away view of the rotors' assembly showing the rotors' and sprocket arrangement for the 3-speed version of the invention wherein one free-wheel clutch is used to connect the shaft and the inner rotor and another free-wheel clutch is used to connect the outer rotor and the sprocket.
Figure 3:
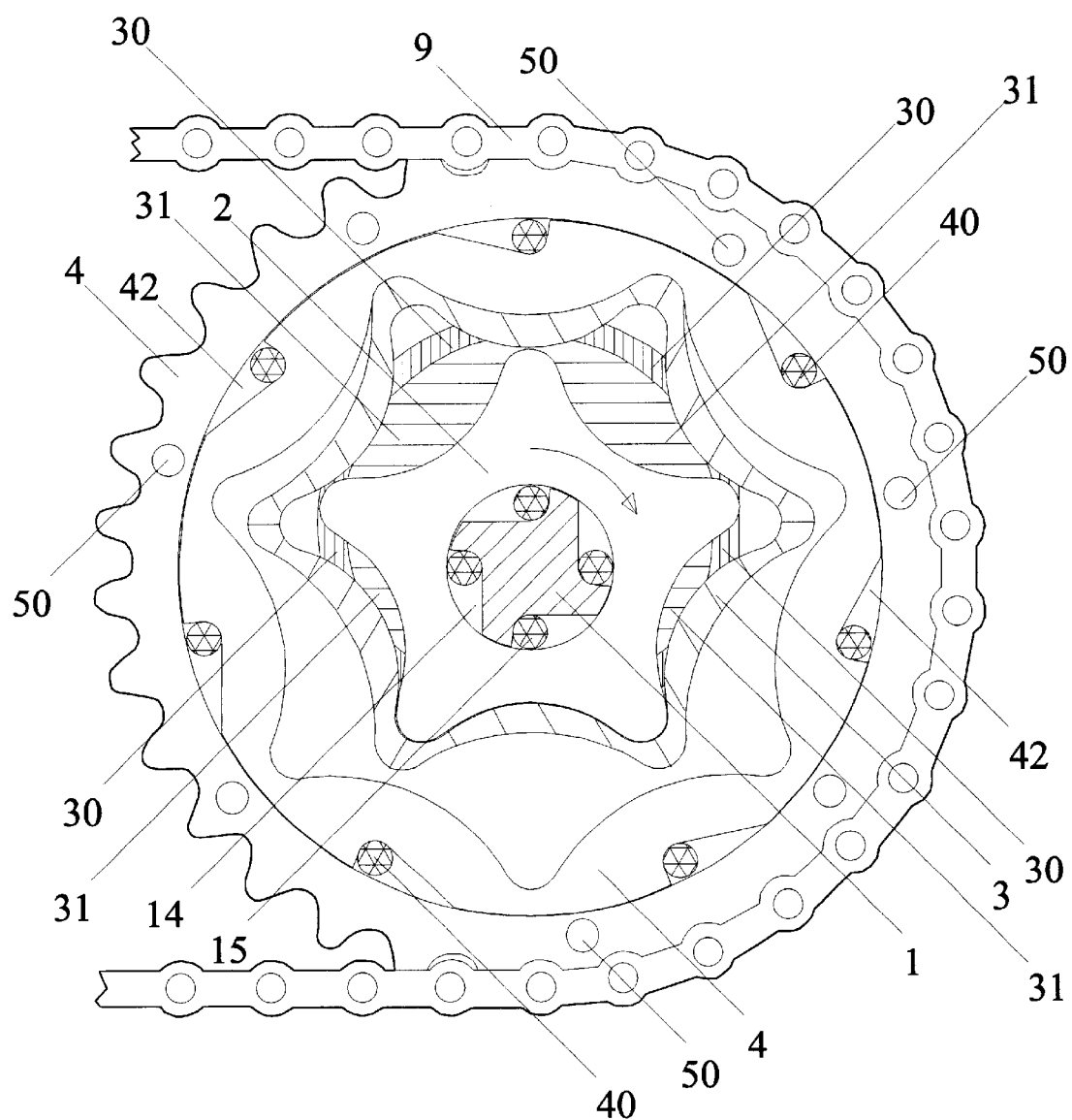
FIG. 3 is a side cut-away view of the rotors' assembly showing the rotors' and sprocket arrangement for the 3-speed version of the invention wherein one overrunning clutch is used to connect the shaft and the inner rotor and another overrunning clutch is used to connect the outer rotor and the sprocket.

As shown in FIGS. 1, 2, and 3, the first version of the present invention comprises three rotors 2, 3, and 4 mounted between a crankshaft 1 and a chain driving sprocket 5. As shown in FIG. 1, the preferred design provides one star-shaped inner rotor 2 mounted onto the crankshaft 1 and connected to the crankshaft by an overrunning clutch 11 shown in FIG. 4. The overrunning clutch 11 comprises a plurality of pawls 10 and a plurality of pawls engaging teeth 22 and engages the rotor only when the rotating speed of the crankshaft 1 exceeds the rotating speed of the rotor 2. As also shown in FIG. 1, the middle rotor 3 is designed to have a plurality of lobe receiving pockets along its inner circumference and a plurality of lobes along its outer circumference. The pockets within the middle rotor 3 are designed to receive the lobes of the inner rotor 2 as shown in FIGS. 1, 2 and, 3.

As also shown in FIGS. 1, 2, and 3, the outer rotor 4 is designed to have a plurality of pockets along its inner circumference and these pockets are designed to receive the lobes of the middle rotor 3. The chain driving sprocket 5 is mounted onto the outer rotor 4 and connected to this rotor 4 by a plurality of self-engaging rollers 40 which act as an overrunning clutch which provides a firm connection in any situation when the speed of the outer rotor 4 exceeds the speed of the sprocket. As shown in FIGS. 1, 2 and 3, the sprocket 5 has a plurality of openings 50 which extend through the sprocket 5. The function of these openings 50 will be explained later in this description. The present invention assumes that the sprocket 5 has a number of teeth which represents a middle sprocket in existing bicycle front set of sprockets.

As shown in FIG. 2, the present invention can also be designed to apply a plurality of pawls 43 mounted onto the outer rotor 4 instead of the self-engaging rollers 40 as described above. The pawls 43 perform an identical function as the self-engaging rollers 40, i. e. they connect the rotor 4 to the sprocket 5 when the speed of the rotor 4 exceeds the speed of the sprocket 5. It is yet another proposal of the present invention to provide two sets of self-engaging rollers as shown in FIG. 3, wherein one set of self engaging rollers 15 connects the crankshaft 1 to the inner rotor 2 and another set of self-engaging rollers 40 connects the outer rotor 4 to the sprocket 5. In any case, the rollers 15 and 40 or pawls 10 and 43 perform exactly the same operation and act as overrunning clutches.

Figure 4:
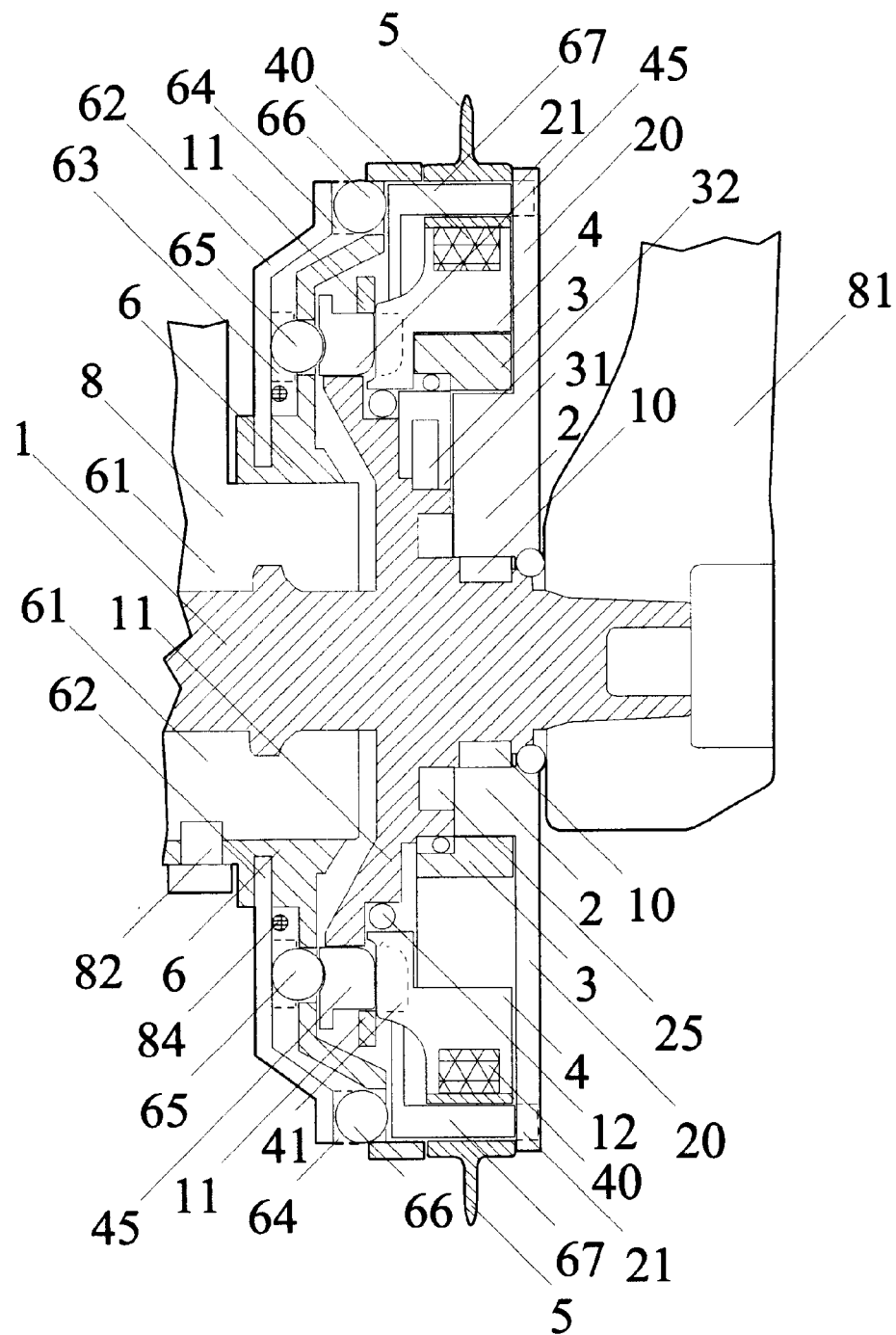
FIG. 4 is a back cut-away view for the 3-speed version of the invention in the situation when the $1^{st}$ speed is engaged.
Figure 12:
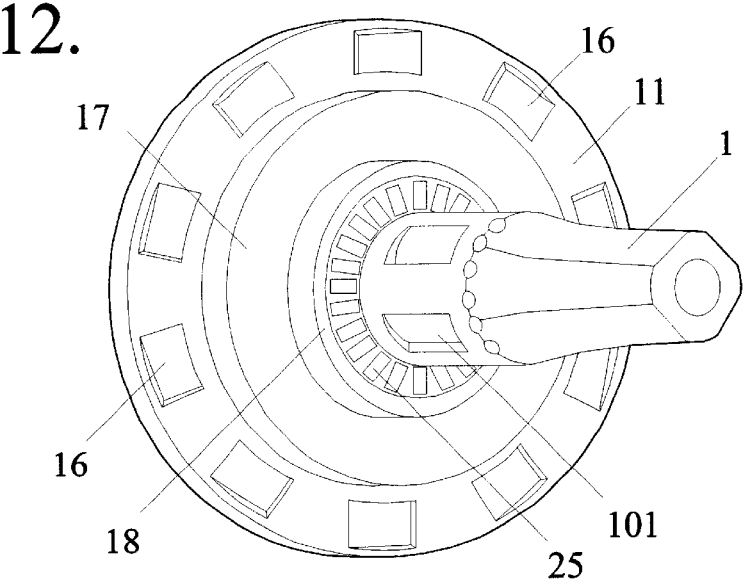
FIG. 12 is a perspective view of the shaft showing its outer section and shaft disc.
Figure 14:
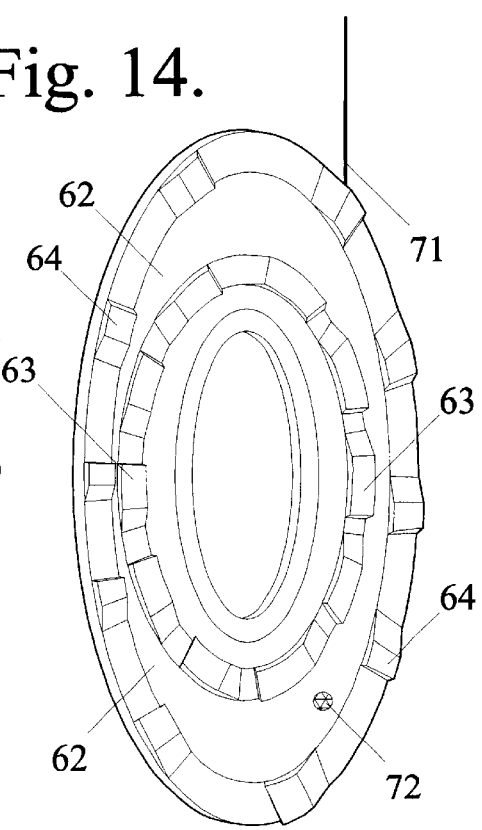
FIG. 14 is a perspective view of the shifting disc.
Figure 15:
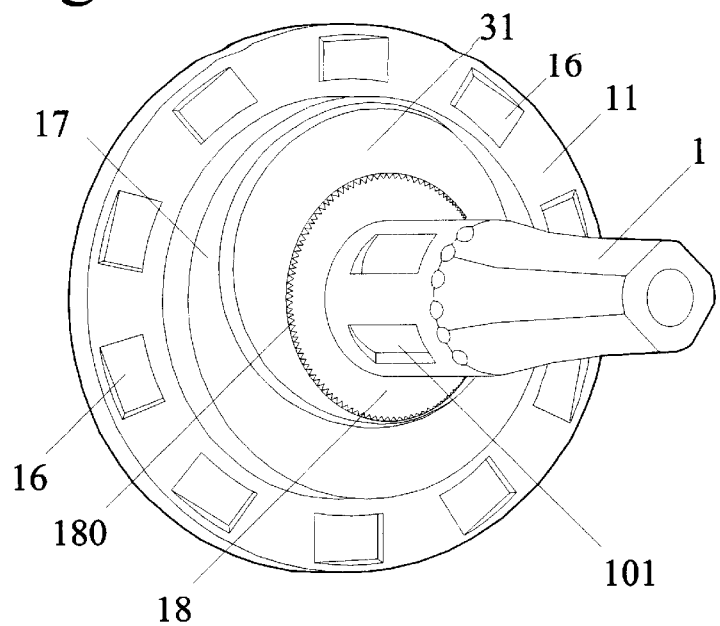
FIG. 15 is a perspective view of the crankshaft showing its outer section, shaft disc, and eccentric disc.
Figure 17:
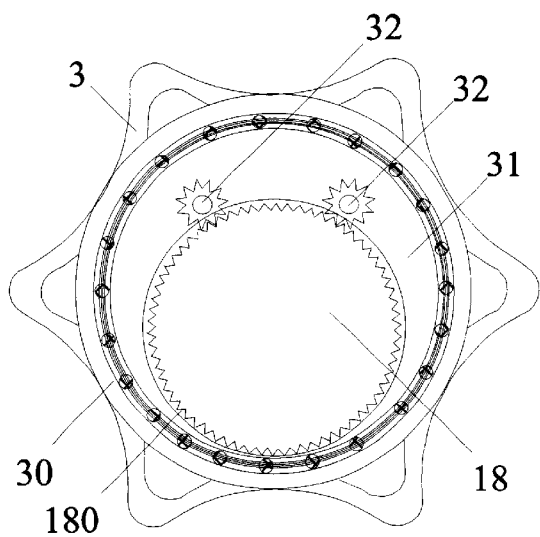
FIG. 17 is the side cut-away view of the eccentric disc mounted between the crankshaft and the middle rotor.
Figure 18:
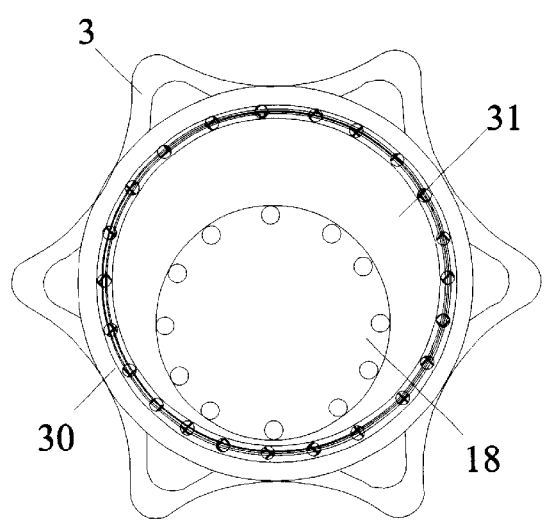
FIG. 18 is the side cut-away view of the alternative version of the eccentric disc mounted between the crankshaft and the middle rotor.

As shown in FIGS. 4, 5, 6, 7, and 8, the rotors 2, 3, and 4 are mounted onto the crankshaft 1 proximate to the crank 81 while the shifting unit assembly 6 and 62 is mounted onto the bottom bracket 61. A shaft disc 11 is firmly connected to the crankshaft 1 or made as an integral part of the crankshaft 1 as shown in FIGS. 4, 12, and 14. As shown in FIGS. 12 and 15, the shaft disc 11 comprises a smaller circular elevated section 18 and a larger circular elevated section 17. The elevated section 18 carries a eccentric disc 31 as shown in FIGS. 4 and 15 and can be made either having a flat surface as shown in FIG. 12 or having a toothed surface (gear) 180 as shown in FIGS. 15 and 17. The elevated section 17 is designed to carry a ball bearing 12 as shown in FIG. 4. A roller bearing 25 is provided within the elevated section 18 as shown in FIGS. 4 and 12 and this bearing is located proximate to the inner rotor 2. As shown in FIG. 12, pawl seats 101 can also be made within the crankshaft 1 and the disc 11 has a plurality of openings 16 as shown in FIGS. 12 and 15. As shown in FIG. 4, the openings 16 are designed to receive the $2^{nd}$ speed's shifting ring 49 pins 45 shown also in FIG. 20.

Figure 9:
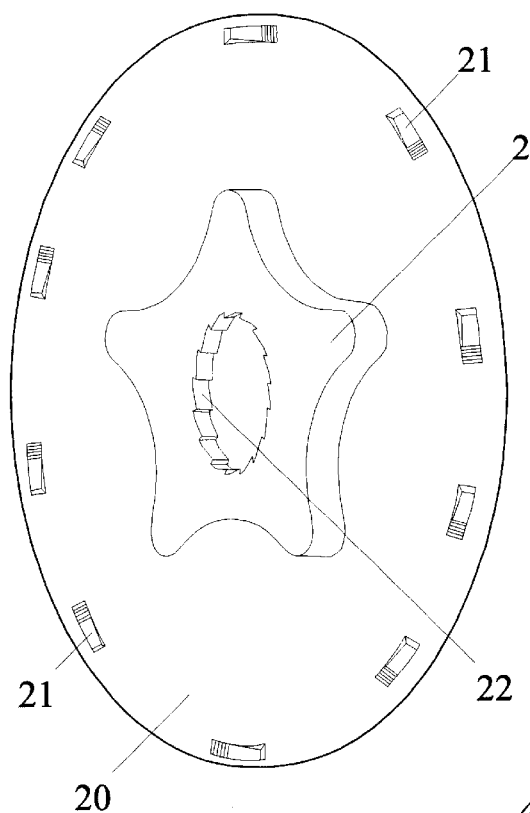
FIG. 9 is a perspective view of the inner rotor and its disc.

As shown in FIG. 4, the inner rotor 2 is mounted onto the crankshaft 1 between the crank 81 and the shaft disc 11 and it comprises a disc 20 which extends along the outer side of the middle rotor 3 and the outer rotor 4. The disc's 20 outer circumference corresponds to the circumference of the sprocket 5 and it can be made as an integral part of the inner rotor 2 as shown in FIGS. 4 and 9. The disc 20 has a plurality of grooves 21 proximate to its outer circumference as also shown in FIGS. 4 and 9. These grooves 21 are designed to receive the $3^{rd}$ speed ring's 68 pins 67 as explained later in this description. As shown in FIG. 9, the plurality of pawl engaging teeth 22 can also be incorporated within the central opening of the rotor 2.

Figure 10:
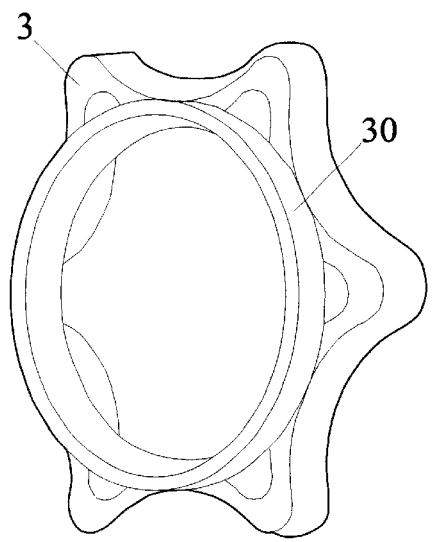
FIG. 10 is a perspective view of the middle rotor and its support ring.
Figure 16:
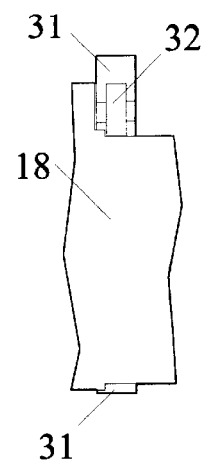
FIG. 16 is the cut-away view of the crankshaft and the eccentric disc along the section wherein the eccentric disc is mounted onto the crankshaft.

The middle rotor 3 encompasses the inner rotor 2 as shown in FIGS. 1 and 4 and it has a side-mounted support ring 30 which is either attached to the rotor 3 or made as an integral part of this rotor 3 as shown in FIG. 10. As shown in FIGS. 1, 4, 15, 17, and 18, the ring 30 of the middle rotor 3 is mounted onto the eccentric disc 31 and rotates around this disc 31. The eccentric disc 31 forces the middle rotor to rotate on an axis which is different from the rotating axis of the inner rotor 2 and the outer rotor 4. As shown in FIGS. 16 and 17, the eccentric disc 31 has two gears 32 mounted proximate to its inner opening which mesh with the gear 180 on the elevated section 18. The gears 32 mesh with the gear 180 on the elevated section 18 as shown in FIG. 16, so as to ensure that the eccentric disc 31 is always kept in the same position with respect to both the inner 2 and outer rotors 4.

In order for the invention to work, it is necessary that the middle rotor 3 always rotates around the same axis which is different with respect to the rotating axis of both other rotors 2 and 4. Therefore, it is necessary to provide the eccentric disc 31 which has the same axis as the middle rotor 3. Since without the eccentric disc 31 the middle rotor 3 will actually orbit around the inner rotor 2, the movement of the middle rotor 3, when mounted onto the eccentric disc, can not cause the eccentric disc 31 to rotate around the crankshaft's elevated section 18. Namely, the force which would be applied by the middle rotor 3 to the eccentric disc 31 is pointed at an sharp angle which cannot be followed by the eccentric disc 31. Consequently, provided that there is no significant friction resistance, the eccentric disc 31 will remain in its position. Therefore, the elevated section 18 and the inner circumference of the eccentric disc 31 can be made flat with a ball bearing provided between them as shown on FIG. 17 so as to allow the crankshaft 1 to turn inside the eccentric disc 31. In any case, it is considered advantageous to provide the gears 32 to absolutely ensure that the eccentric disc 31 is always kept in its proper position.

Figure 11:
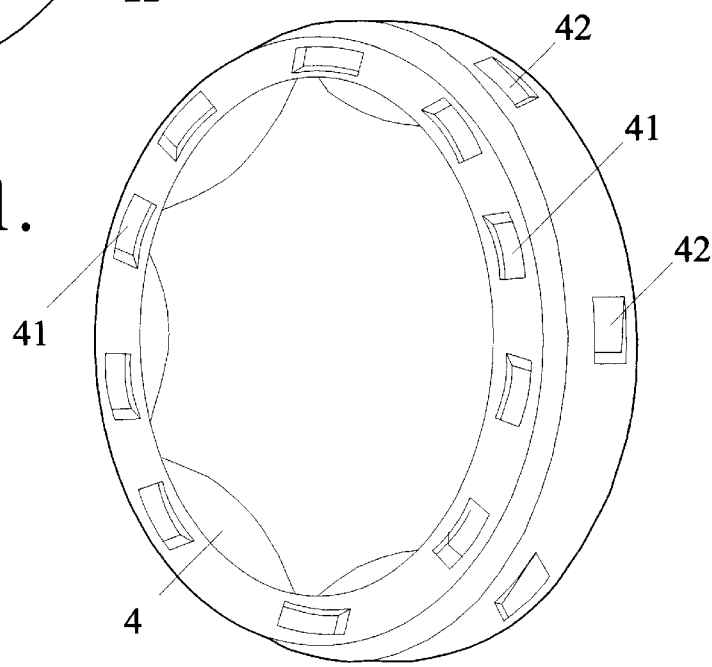
FIG. 11 is a perspective view of the outer rotor and its engaging section.

As shown in FIGS. 1 and 4, the outer rotor 4 is mounted both onto the middle rotor 3 and the ball bearing 12. As shown in FIG. 4 and 11, the outer rotor 4 has a side ring that encompasses the ball bearing 12 which forces the rotor to rotate around the given axis. The side ring of the outer rotor 4 has a plurality of grooves 41 which receive the $2^{nd}$ speed ring's 49 pins 45 and it also may have a plurality of roller seats 42 as shown in FIG. 11. It is to be understood that the connection between the outer rotor 4 and the sprocket 5 can be obtained either by the self-engaging rollers 40 as shown in FIG. 1 or by an overrunning clutch mounted between the rotor 4 and the sprocket 5.

Figure 13:
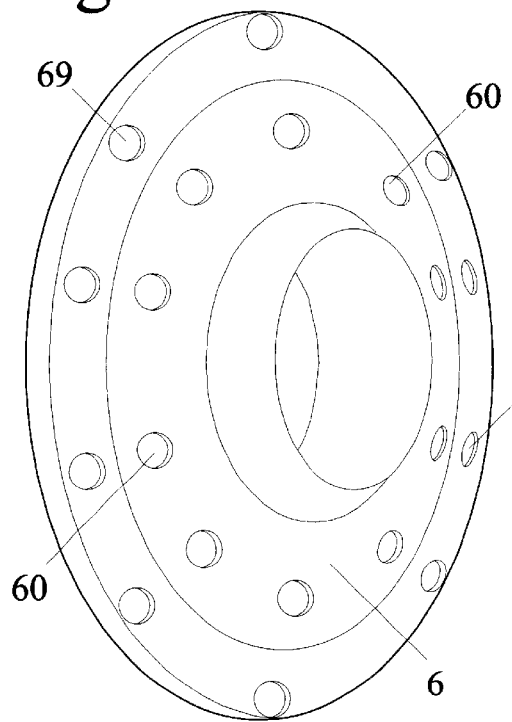
FIG. 13 is a perspective view of the shifting unit's base.
Figure 20:
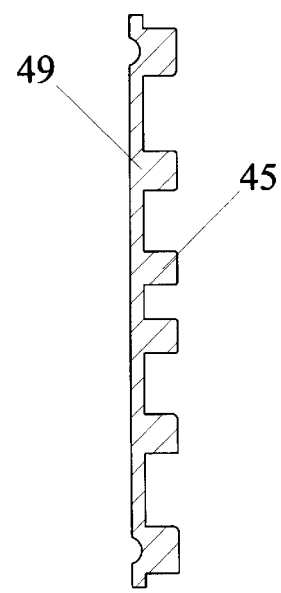
FIG. 20 is a perspective view of the $2^{nd}$ speed ring.

As shown in FIGS. 1 and 4, the sprocket 5 encompasses the outer rotor 4 and rotates around the same axis as the inner rotor 2 and outer rotor 4. The shifting unit assembly shown in FIG. 4 and 13, comprises a unit's base 6, and a shifting disc 62, wherein the unit's base 6 is mounted and firmly connected to the bottom bracket 61 by the bolt 82 as shown in FIG. 4. The unit's base 6 encompasses the bottom bracket 61 and circularly extends along the rotors' assembly while the shifting disc 62 is rotatably mounted onto the unit's base 6. As shown in FIG. 14, the shifting disc 62 comprises two sets of cam sections 63 and 64. The $2^{nd}$ speed shifting ring 49 which has a plurality of pins 45, shown in FIG. 20, is mounted proximate to the shaft disc 11 and its pins 45 are inserted within the openings 16 as shown in FIG. 4. A plurality of balls 65 are provided within openings 60 in the unit's base 6 between the shifting disc 62 and the shifting ring 46 as shown in FIG. 4.

Figure 5:
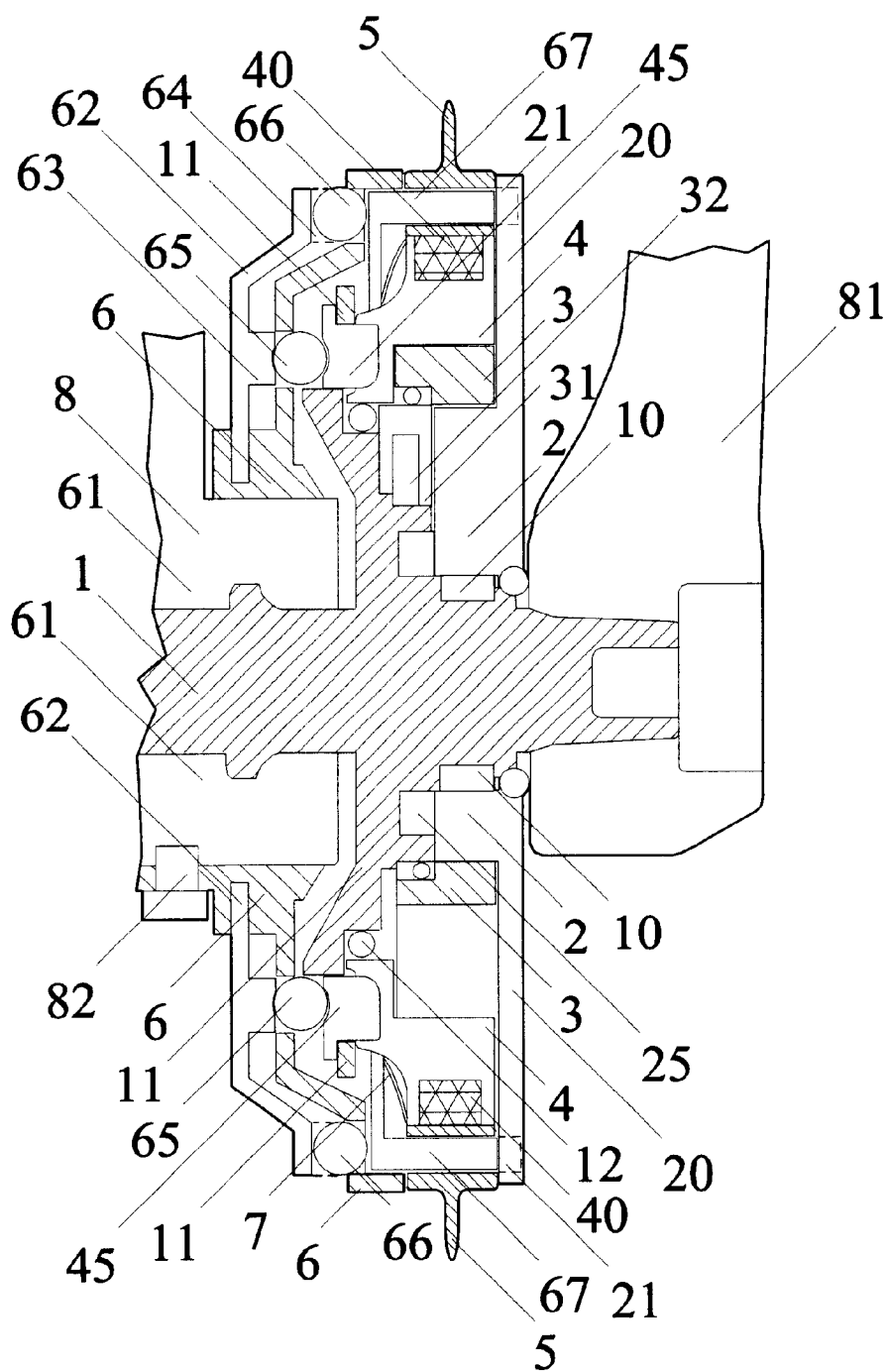
FIG. 5 is a back cut-away view for the 3-speed version of the invention in the situation when the $2^{nd}$ speed is engaged.
Figure 19:
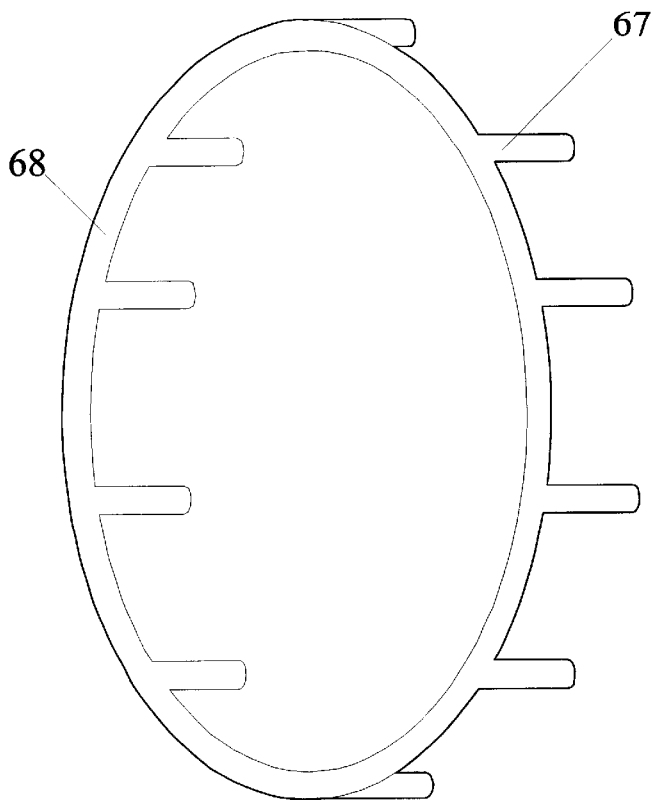
FIG. 19 is a perspective view of the $3^{rd}$ speed ring.

The shifting disc 62 is rotated in one direction by a shifting cord 71 which is connected to the shifting disc 62 over the pin 72 as shown in FIG. 14 and in another direction by a circular spring 84 shown in FIG. 4. The spring 84 is at one end connected to the shifting disc 62 and at the other end to the shifting base unit 6. As shown in FIG. 19, the $3^{rd}$ speed shifting ring 68 has a plurality of pins 67 which are inserted within the openings 50 in the sprocket as shown in FIG. 4. The 3rd speed shifting ring 68 is located proximate to the cam sections 64 in the shifting disc 62 and a plurality of balls 66 are provided between this ring 68 and the shifting disc 62. Both sets of balls 65 and 66 are provided in order to allow a frictionless contact between the shifting disc 62 which is always stationary and the shifting rings 68 and 49 which always rotate together with the entire rotor assembly. As shown in FIG. 5, a circular retracting spring 7 is also mounted between the shifting ring 68 and the outer rotor 4.

Figure 7:
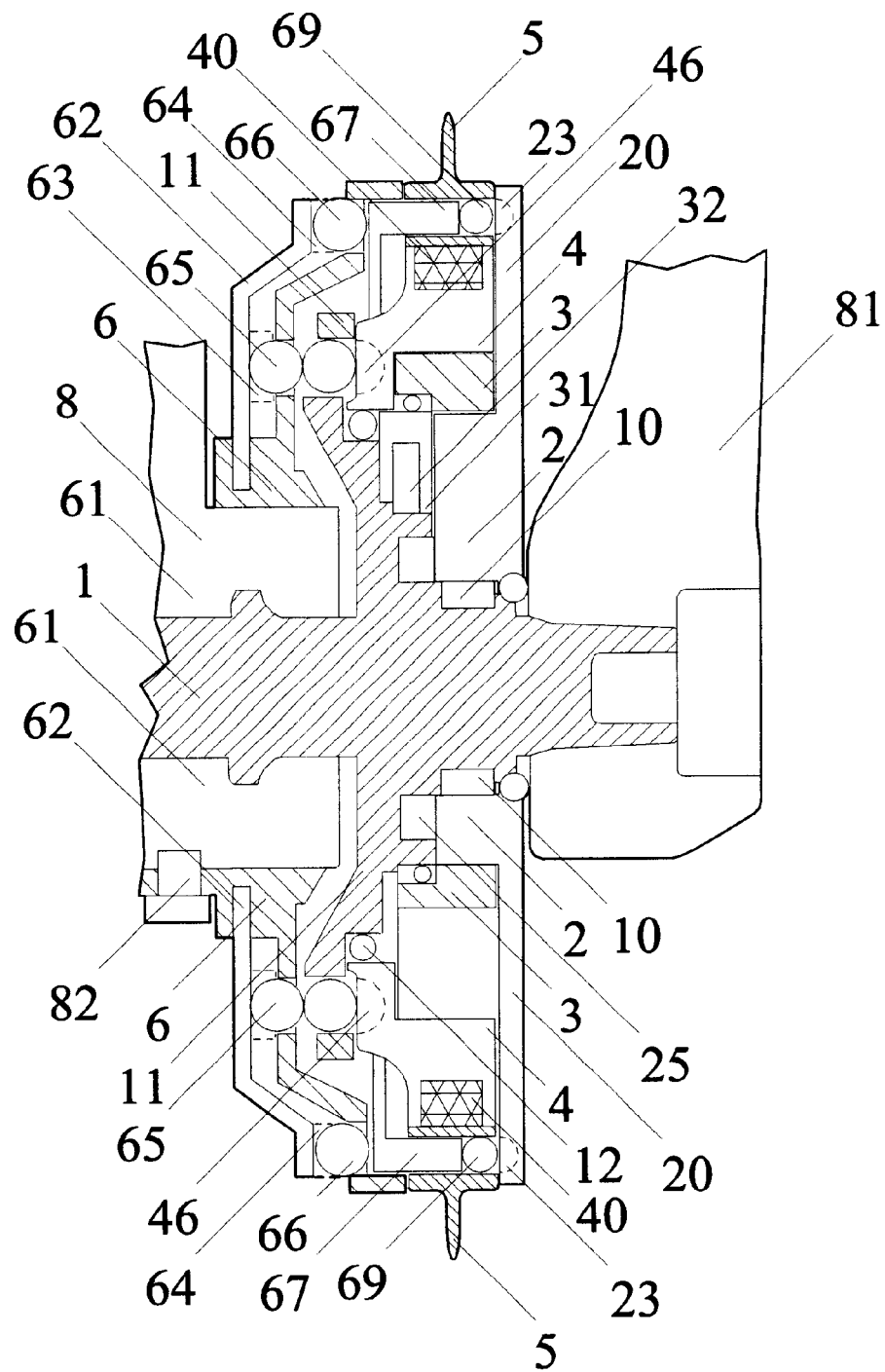
FIG. 7 is a back cut-away view for the 3-speed version of the invention showing the alternative arrangement wherein the balls are used to provide the connection between the crankshaft and the outer rotor and the connection between the inner rotor and the sprocket.

As shown in FIG. 7, the another design of the present invention can provide a connection between the shaft's disc 11 and the outer rotor 4 over the balls 65 without applying the $2^{nd}$ speed ring 49. In this configuration, the balls 65 which engage the $2^{nd}$ speed are slidably housed within the shaft disc's openings 16 and shifting unit base openings 60 and pushed into the grooves 46 in the outer rotor 4 by the shifting disc 62. As also shown in FIG. 7, the connection between the sprocket 5 and the inner rotor's disc 20 is also provided by a plurality of balls 69 which are slidably received within the openings 50 in the sprocket 5. The balls 69 are located between the $3^{rd}$ speed ring's 67 pins 68 and the inner rotor's disc 20 in the openings 50 as shown in FIG. 7.

Figure 8:
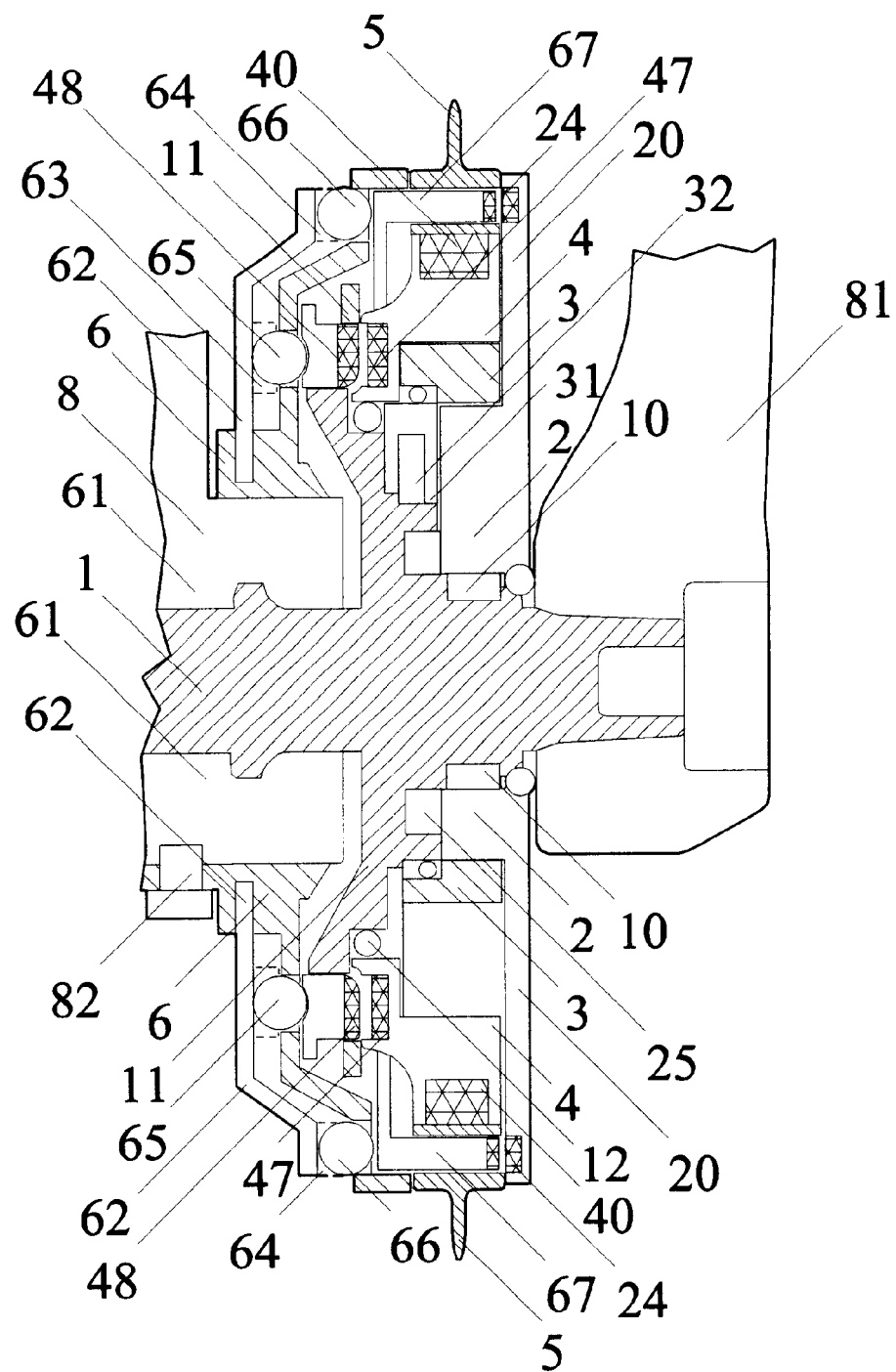
FIG. 8 is a back cut-away view for the 3-speed version of the invention showing yet another alternative arrangement wherein the friction rings are used to provide the connection between the crankshaft and the outer rotor and the connection between the inner rotor and the sprocket.

As shown in FIG. 8, it is yet another alternative proposal of the present invention to provide one friction ring 48 in the $2^{nd}$ speed ring 49 and another friction ring 47 in the outer rotor 4 in order to establish the connection between the shaft disc 11 and the outer rotor 4. This design uses the friction ring 47 instead of the grooves 41 to connect the outer rotor 4 to the shaft disc 11 over the balls 65 and the $2^{nd}$ speed ring's pins 45. The design shown in FIG. 8 also proposes that another friction ring 24 is provided within the inner rotor's disc 20 instead of grooves 21. In such case, the connection between the sprocket 5 and the disc 20 is established when the outer ends of the $3^{rd}$ speed ring's pins 67 are pushed against the friction ring 47.

It is to be understood that regarding the connections between the shaft disc 11 and the outer rotor 4 and the connections between the sprocket 5 and the inner rotor's disc 20, any of the above described combinations can be applied either as presented in FIGS. 4, 7, and 8 or in any other combination. It is also to be understood that both of said connections can be obtained by applying some other similar connecting means, such as pawls or rollers.

The following description of the process for the present invention assumes that all members are positioned as shown in FIG. 4 which represents the situation that produces the slowest possible sprocket rotating speed, hereinafter defined as the "$1^{st}$ speed". According to the process of the present invention, the device is powered by rotating the crank 81 which, in turn, forces the crankshaft 1 and shaft disc 11 to rotate at the same speed and in the same direction. When the crankshaft 1 starts to turn forwards, the pawls 10 engage the toothed sections 22 and provide firm connection between the crankshaft 1 and the inner rotor 2 which is also forced to turn in the same direction. The lobes of the inner rotor 2 further force the middle rotor 3 to rotate around the eccentric disc in the same direction. Also, as the crankshaft 1 rotates, its gear 180 turns the gears 32 in the eccentric shaft 31 and this action keeps the eccentric disc 31 in its position at all times.

As shown in FIG. 4, some lobes of the middle rotor 3 are always positioned to act against the pockets in the outer rotor 4 and they transmit the force onto the outer rotor 4. This action forces the outer rotor 4 to rotate in the same direction and over the clutch 40 engage the sprocket 5 which is also forced to rotate in the same direction. The edge of the outer rotor 4 is mounted onto the ball bearing 12 as shown in FIG. 4, and the ball bearing 12 keeps the outer rotor 4 turning around the proper axis. Since the inner rotor 2 has less lobes than the middle rotor's 3 pockets and the middle rotor 3 has less lobes than the outer rotor's pockets, the sprocket 5 is rotating at a rate slower than the rotating rate of the crankshaft. The difference in the rotating ratio between the crankshaft and the sprocket is defined by the difference between the number of lobes and number of pockets.

The above described process presents the situation wherein the sprocket 5 rotates at minimum possible speed with respect to the speed of the crankshaft 1 and this situation presents the $1^{st}$ speed. When the shifting cord 71, shown in FIG. 14, is pulled by one step, it forces the shifting ring 62 to rotate counterclockwise which, in turn, brings the cam sections 63 into the position shown in FIG. 5. This action causes the cam sections 63 to displace the balls 65 which further act against the ring 49 and force the pins 54 into the grooves 41 as also shown in FIG. 5. When the pins 45 enter the grooves 41, they 45 create the firm connection between the shaft disc 11 and the outer rotor 4. As the result, the outer rotor 4 is forced to rotate together with the shaft disc 11, i. e. at a faster rate than during the previous process.

Since the outer rotor 4 starts rotating at the same rate as the shaft 1 and since its connection over the middle rotor 3 to the inner rotor 2 causes the inner rotor to start rotating faster, the overrunning clutch 10 disengages the connection between the shaft 1 and the inner rotor 2. Over the overrunning clutch 40, the outer rotor 4 forces the sprocket 5 to rotate at the same speed which is identical to the rotating speed of the shaft 1 and represents the $2^{nd}$ speed. The inner rotor 2 now rotates faster than the sprocket 5 but it is not able to influence the sprocket's rotating speed and the disc 20 rotates idly around the sprocket 5. When the shifting cord 71 is pulled by one more step, it forces the shifting ring 62 to further rotate counterclockwise which causes the cam sections 64 into the position shown in FIG. 6. The cam sections 63 are designed with the longer surfaces and they still keep the balls 65 displaced into the grooves 41, thereby still providing a firm connection between the shaft ring 11 and the outer rotor as also shown in FIG. 6.

Figure 6:
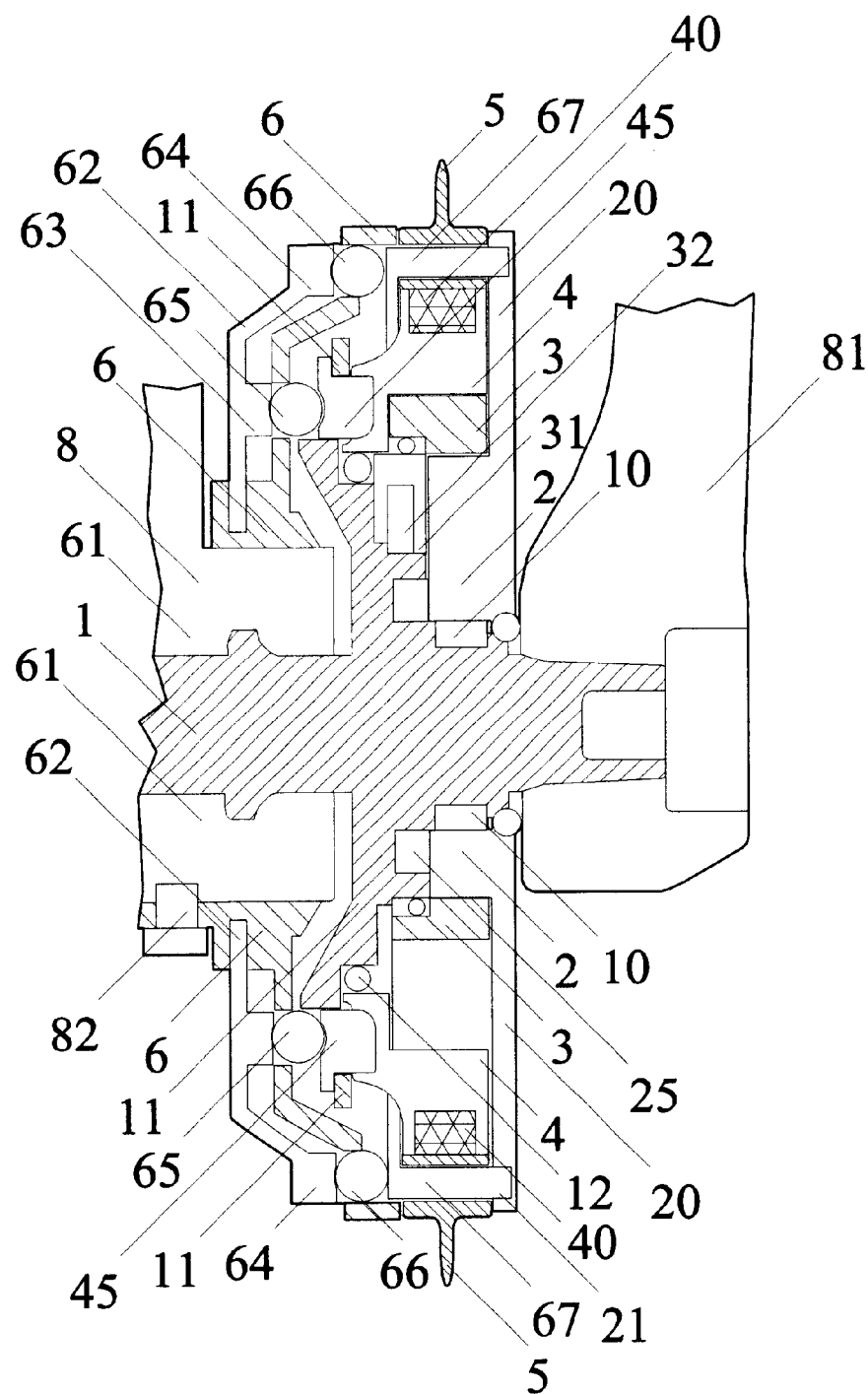
FIG. 6 is a back cut-away view for the 3-speed version of the invention in the situation when the $3^{rd}$ speed is engaged.

When the cam sections 64 are pulled into the position as shown in FIG. 6, they displace the balls 66 which further act against the $3^{rd}$ speed ring 68 and force the pins 67 to enter the grooves 21. This results in the firm connection between the sprocket 5 and the disc 20 which causes the sprocket 5 to rotate at the same speed as the inner rotor 2 and its disc 20. Since a firm connection between the shaft disc 11 and the outer rotor 4 still exists, the rotating speed of the inner rotor 2 and the disc 20 is faster than the rotating speed of the outer rotor. Also, since the sprocket 5 starts rotating at the speed rate of the inner rotor 2, the overrunning clutch 40 disengages the connection between the outer rotor 4 and the sprocket 5. Consequently, the sprocket rotates at the fastest speed which represents the $3^{rd}$ speed.

Shifting back to the lower gears is performed when the shifting cord 71 is released by one step which enables the spring 84 to pull the shifting disc 62 back so that the cam sections 64 return to their starting position. When the cam sections 64 return to their starting positions, the disc 20 pushes the pins 67 out of the groves 21 which are shaped in a manner that enable such action. The pins 67 and the ring 68 return the balls 66 to their starting position and the connection between the sprocket 5 and the disc 20 ceases to exist as shown in FIG. 5. When the sprocket 5 and the disc 20 are disconnected, the power is again transmitted from the outer rotor 4 to the sprocket 5 over the overrunning clutch 40 which is engaged again. The sprocket 5 again rotates at the rate which corresponds to the $2^{nd}$ speed and all members are positioned as shown in FIG. 5. The ring 68 is kept into its starting position by the circular spring 7 which prevents the ring 68 and the pins 67 to lean against the disc 20 when they are not pushed by the cam sections 64.

When the shifting cord 71 is released by one more step, the spring 84 pulls the shifting disc 62 back so that the cam sections 63 return to their starting position. As the cam sections 63 return to their starting positions, the outer rotor 4 displaces the pins 45 out of the groves 41 and the ring 49 return the balls 60 to their starting position as shown in FIG. 4. This eliminates the connection between the outer rotor 4 and the shaft disc 11 and the overrunning clutch 10 engages the inner rotor 2 again. The power is again transmitted from the inner rotor 2 to the outer rotor 4 over the middle rotor 3 and further to the sprocket 5 over the overrunning clutch 40. The sprocket 5 again rotates at the rate which corresponds to the $1^{st}$ speed and all members are again positioned as shown in FIG. 4.

Regarding the alternative designs shown in FIGS. 7 and 8, the entire up and down shifting process is identical as described above. The only difference is that, in the case of the design shown in FIG. 7, the connection between the shaft disc 11 and the outer rotor 4 is established over the balls 65 which are pushed by the cam sections 63 into the grooves 46. This results in the $2^{nd}$ speed according to the same operating principles as described above. Also, the connection between the disc 20 and the sprocket 5 is provided by the balls 69 which are displaced into the grooves 23. This action also produces the $3^{rd}$ speed according to the same operating principles as described above.

With regard to the design shown in FIG. 8, the difference is that the connection between the outer rotor 4 and the shaft disc 11 is established over the friction surfaces (rings) 48 and 47 shown in FIG. 8. Such connection also results in the $2^{nd}$ speed according to the same operating principles as described above. Also, the connection between the sprocket 5 and the disc 20 is established by providing the contact between the pins 67 and friction surfaces 24 in the disc 20. The displacement of the pins 67 toward the friction surfaces 24 is identical to the above described process and also results in the $3^{rd}$ speed. Shifting back into the lower speeds is also in all said instances identical to the above described process.

Figure 21:
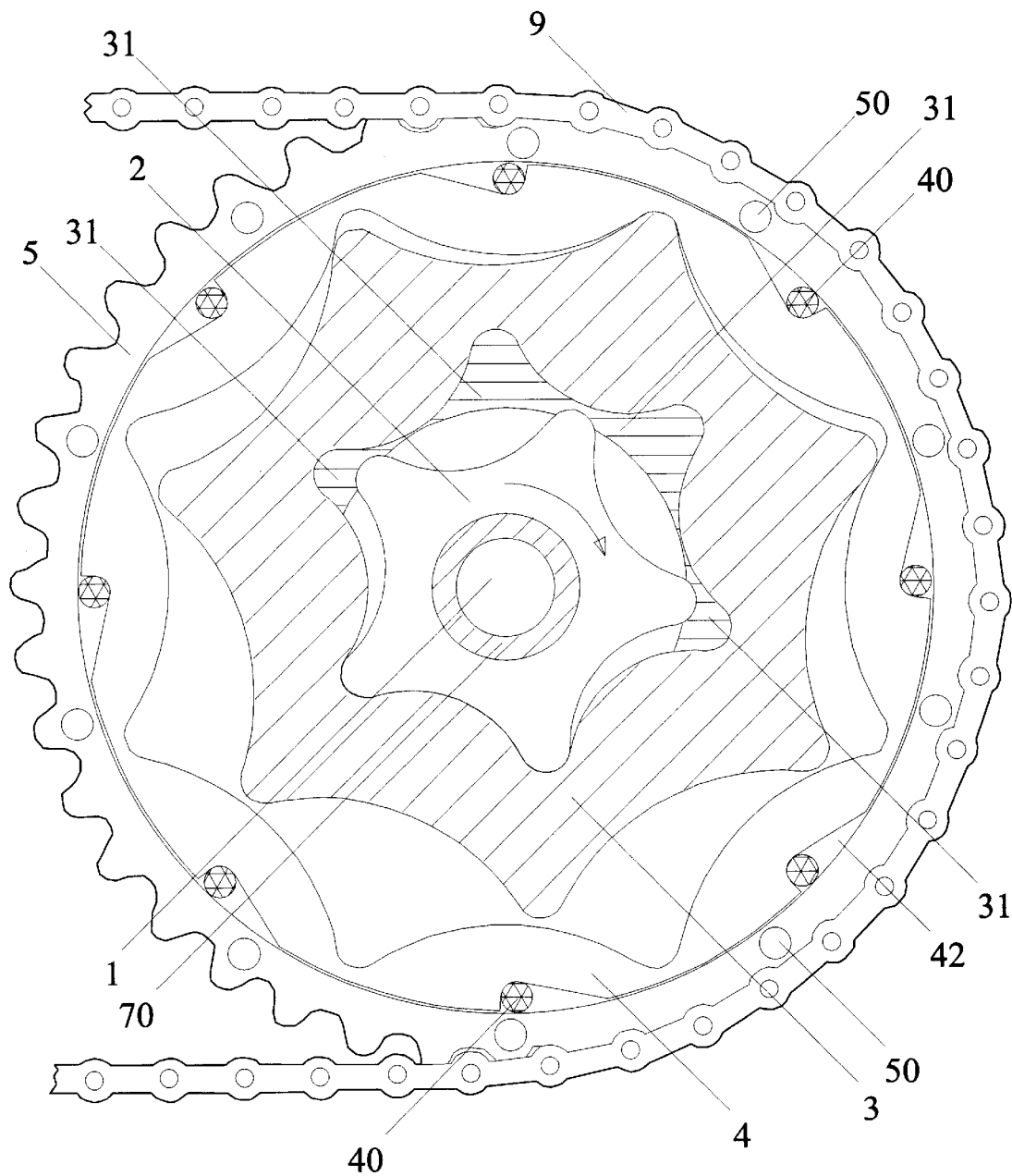
FIG. 21 is a side cut-away view of the rotors' assembly showing the rotors' and sprocket arrangement for the first 2-speed version of the invention wherein the sprocket has a minimum number of teeth.
Figure 22:
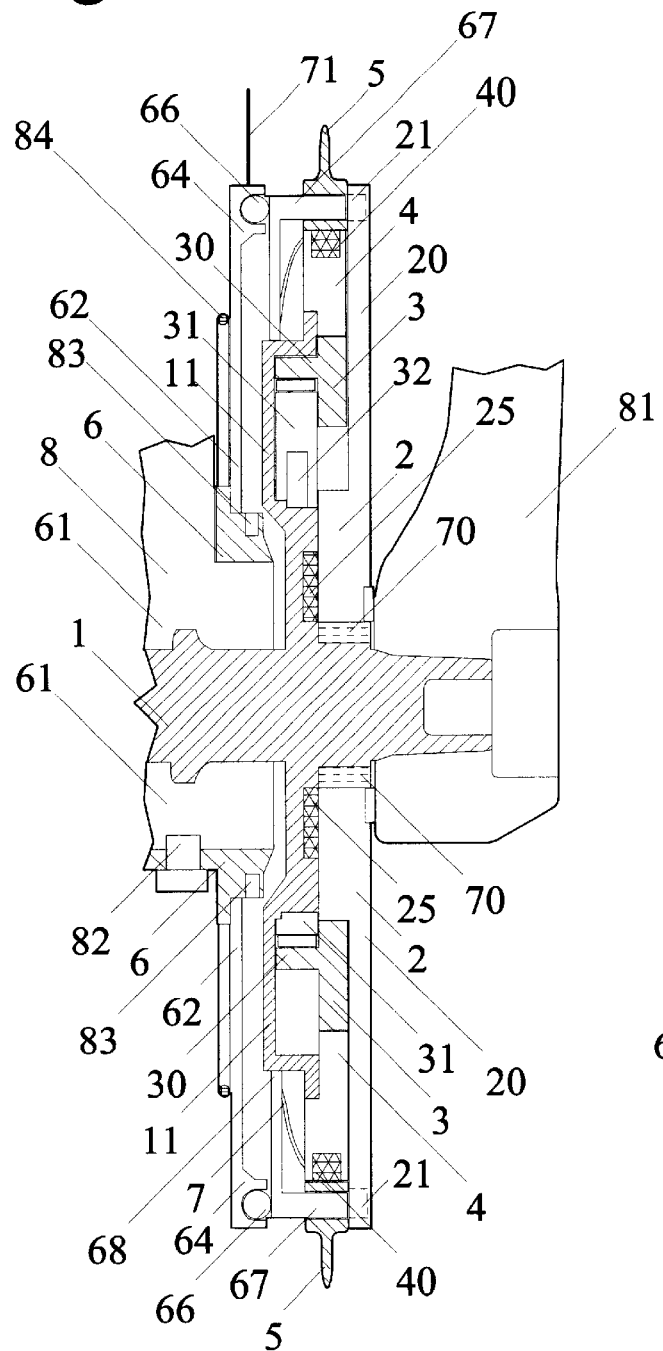
FIG. 22 is a back cut-away view of the invention for the first 2-speed version of the invention in the situation when the $1^{st}$ speed is engaged.
Figure 23:
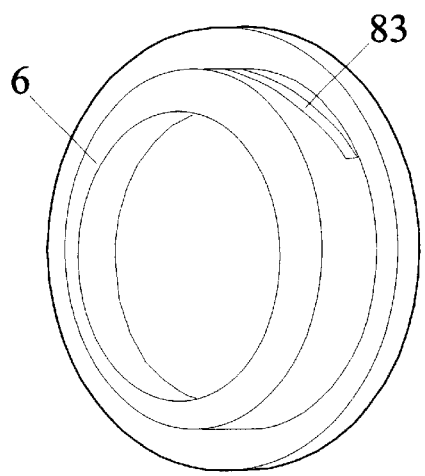
FIG. 23 is a perspective view of the shifter's base for the 2-speed version of the invention.
Figure 24:
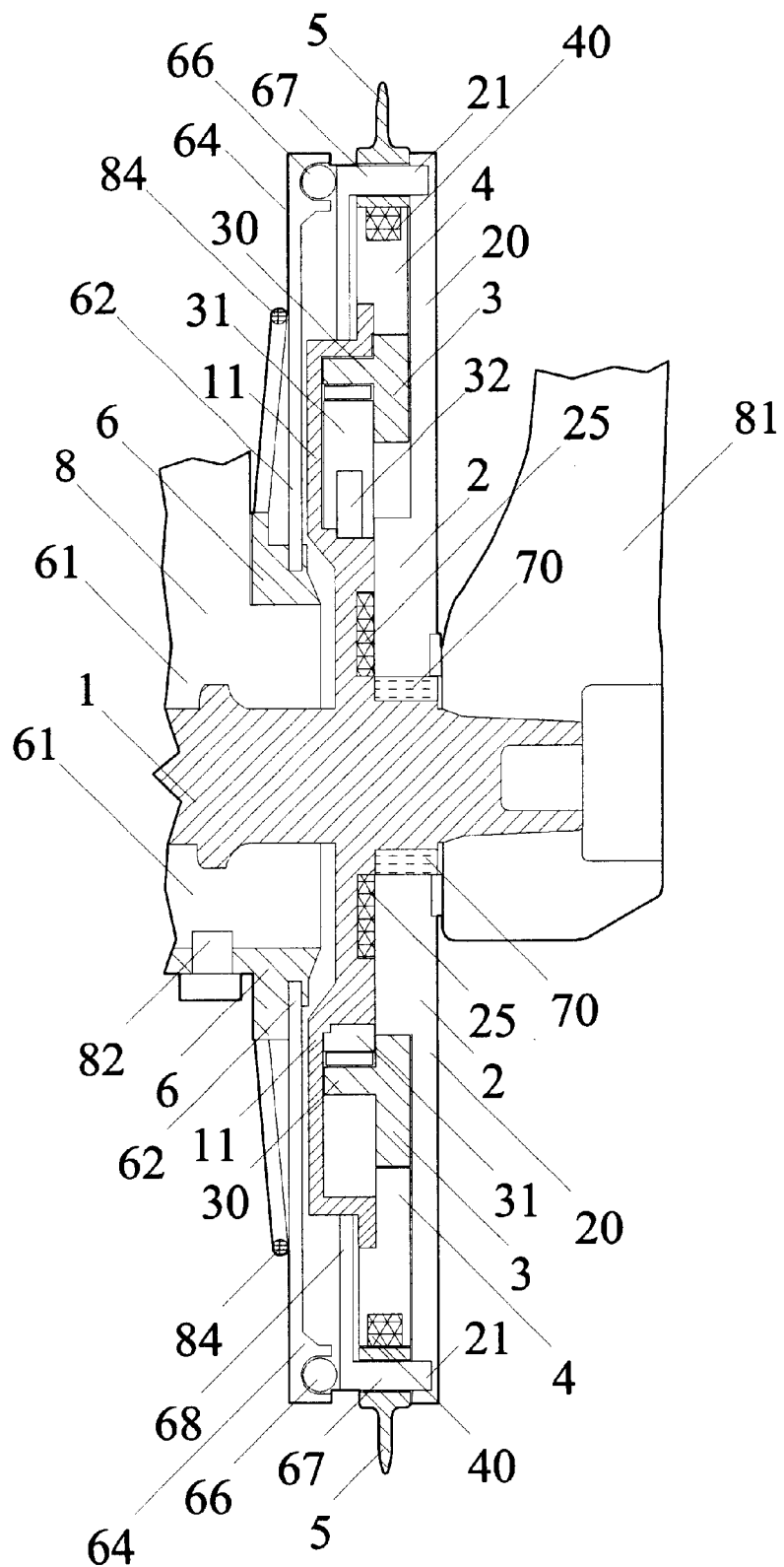
FIG. 24 is a back cut-away view of the invention for the first 2-speed version of the invention in the situation when the $2^{nd}$ speed is engaged.

As shown in FIGS. 21, 22, 23, and 24, the present invention also provides a design which represents a 2-speed device for use in bicycles and similar pedal-powered vehicles. As in the case of the previously presented designs, this design also comprises the shaft 1, the shifting disc 62, the shifting base unit 6, the sprocket 5, and the rotor assembly comprising the inner rotor 2, middle rotor 3, and the outer rotor 4. As shown in FIG. 22 and 24, this design uses only one shifting ring 68 and has a different shifting base unit as shown in FIGS. 22 and 23. As shown in FIGS. 21, 22, and 24, the rotor assembly is structured identically as described for the previous designs while the inner rotor 2 is mounted onto the shaft 1 over the bearing 70 which enables the completely free rotation of the inner rotor 2 with respect to the shaft 1.

As shown in FIG. 22 and 24, the shaft disc 11 is firmly connected to the outer rotor 4, which forces the outer rotor 4 to always rotate at the same speed as the shaft 1. The shifting base unit 6 is firmly connected to the bottom bracket 61 and it has eccentric grooves 83 as shown in FIGS. 22 and 23. Inner portions of the shifting disc 62 are inserted into the grooves 83 as shown in FIGS. 22 and 24 in a manner which enables the groove 83 to drive the shifting disc 62 into the positions shown in FIGS. 22 and 24. When the shifting disc 62 is turned clockwise, it travels towards the rotor assembly and forces the ring 68 and pins 67 to travel in the same direction and into the position as shown in FIG. 24. When the shifting disc 62 is turned back, the grooves 83 forces it to travel outwards into the starting position as shown in FIG. 22.

According to this design, the shifting disc 62 has only one set of the cam sections 64 as shown in FIGS. 22 and 24. These cam sections 64 are designed to also permanently hold the balls 66 in the same position with respect to the cam sections 64. The balls 66 rotate within the cam sections 64 and exert force against the ring 68 when carried by the cam sections 64 towards the rotor assembly.

According to the process for this design of the present invention, when the shaft 1 is turned forward by the crank 81, it forces the outer rotor 4 to rotate in the same direction and at the same speed. Over the overrunning clutch 40, the outer rotor 4 further forces the sprocket 5 to rotate in the same direction and at the same speed. The overrunning clutch is designed to engage the sprocket 5 in any situation when the speed of the outer rotor 4 exceeds the speed of the sprocket 5. In this case, the rotating speed of the sprocket represents the $1^{st}$ speed which is equal to the shaft input rotating speed. This design also assumes that the sprocket 5 has the minimum number of teeth, i. e. 39 teeth in the situation when this device is supposed to replace the sprocket assembly wherein one sprocket has 39 teeth and another sprocket has 54 teeth.

When the shifting disc 62 is pulled by the shifting cord 71, it is driven inwards by the grooves 83 and the balls 66 push the ring 68 until the pins 67 enter the grooves 21 in the disc 20 as shown in FIG. 24. This results in a firm connection between the sprocket 5 and the disc 20 which is rotating faster because the outer rotor 4 forces the inner rotor 2 to rotate at a higher rate. Since the outer rotor 4 has more pockets than the middle rotor 3 lobes and the middle rotor 3 has more pockets than the inner rotor 2 lobes, the inner rotor 2 rotates faster than the outer rotor 4. The overrunning clutch 40 disengages the sprocket 5 and the rotating speed of the sprocket 5 equals the rotating speed of the inner rotor 2 which represents the $2^{nd}$ speed.

When the cord 71 is released, the spring 84 drives the shifting disc 62 into its starting position thereby enabling the disc to push the pins 67 out of the grooves 21 which results in disconnecting the disc 20 from the sprocket 5. When the connection between the disc 20 and the sprocket 25 is terminated, the overrunning clutch 40 engages the sprocket 5 again and the sprocket 5 starts rotating at the same speed as the outer rotor 4 which corresponds to the $1^{st}$ speed. All members are again positioned as shown in FIG. 22 and the output sprocket's 5 speed is equal to the rotating speed of the shaft 1.

Figure 25:
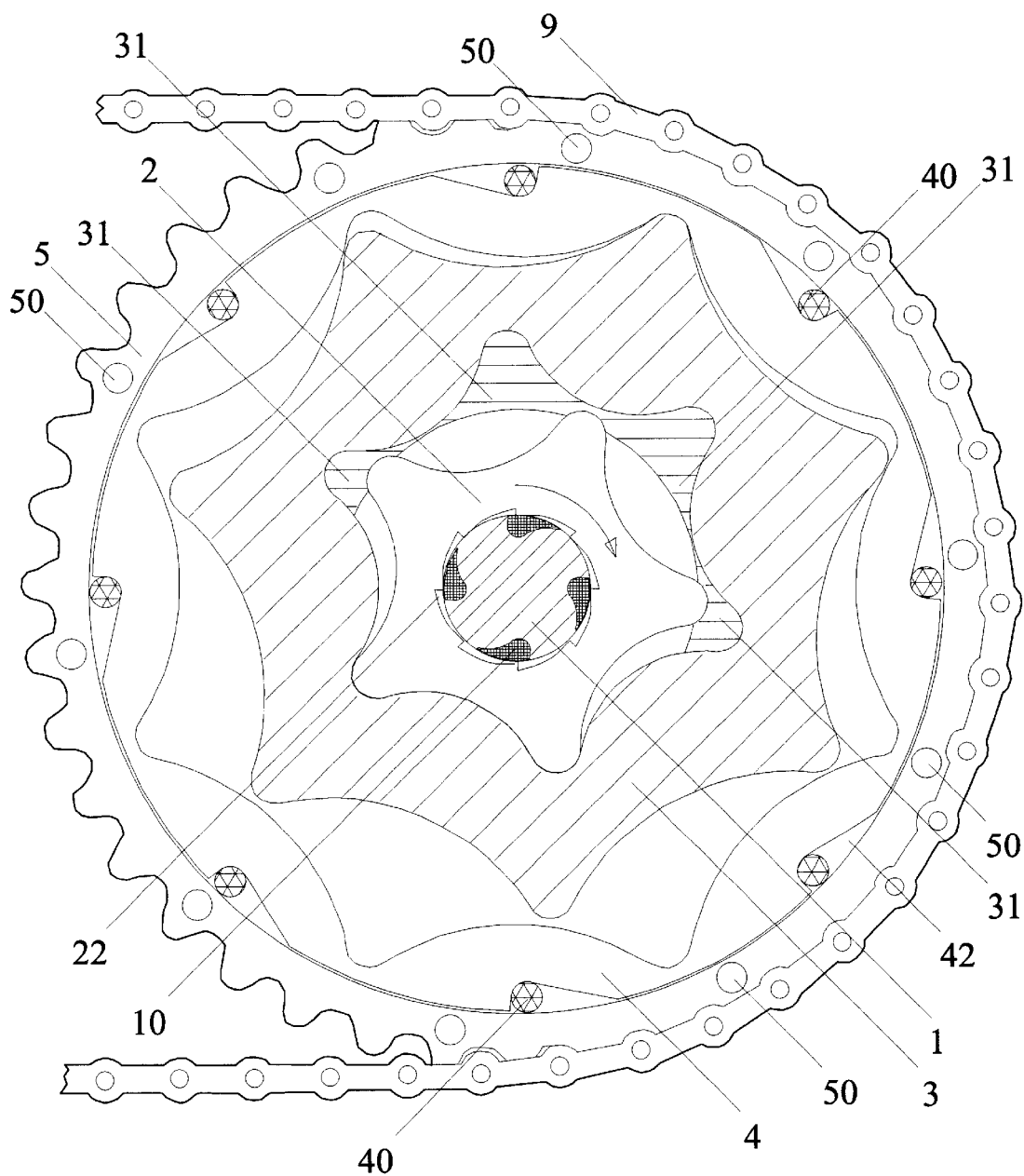
FIG. 25 is a side cut-away view of the rotors' assembly showing the rotors' and sprocket arrangement for the second 2-speed version of the invention wherein the sprocket has a maximum number of teeth.
Figure 26:
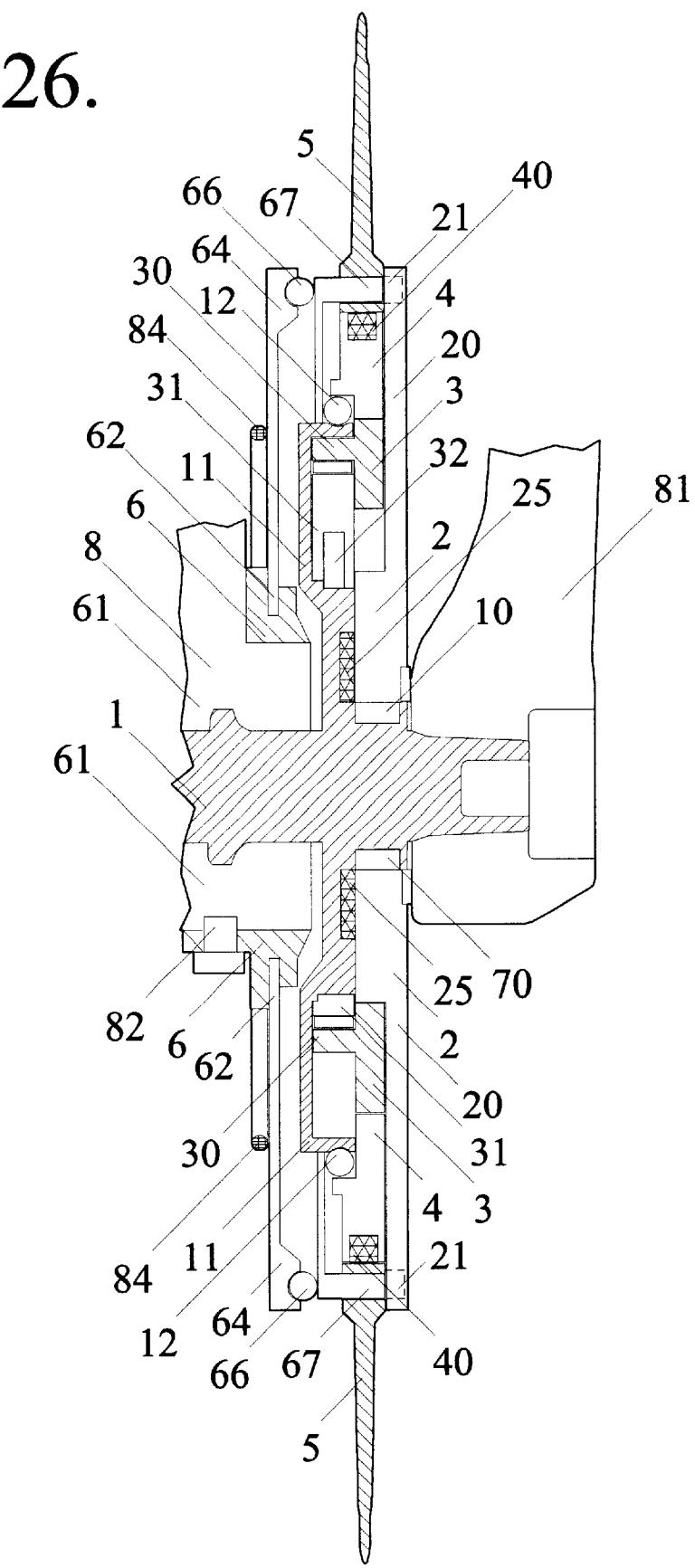
FIG. 26 is a back cut-away view of the invention for the second 2-speed version of the invention in the situation when the $1^{st}$ speed is engaged.
Figure 27:
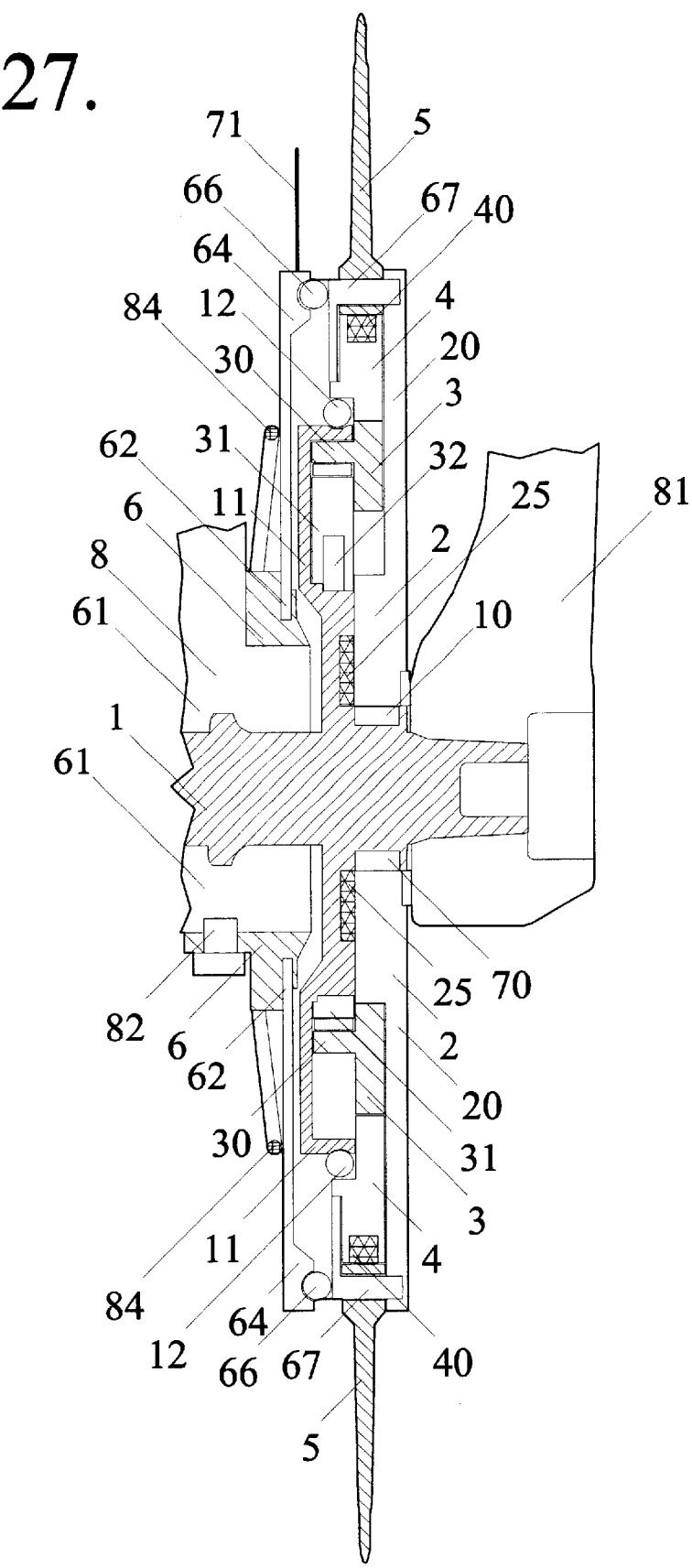
FIG. 27 is a back cut-away view of the invention for the second 2-speed version of the invention in the situation when the $2^{nd}$ speed is engaged.

As shown in FIGS. 25, 26, and 27, the present invention also provides a design which represents the 2-speed device wherein the sprocket has a maximum number of teeth. While having the identical rotors' assembly and shifting unit configuration as described for the previous design, this design uses the overrunning clutch 10 to connect the shaft 1 and the inner rotor 2 as described for the 3-speed designs. It also does not provide the firm connection between the shafts disc 11 and the outer rotor 4 but enables the outer rotor 4 to rotate around the shaft disc 11 as also described for the 3-speed designs and shown in FIGS. 26 and 27.

According to the process for this design of the invention, the $1^{st}$ speed is produced when the inner rotor 2 is firmly connected to the shaft 1 over the overrunning clutch 10 and it transmits power to the outer rotor 4 over the middle rotor 3. The outer rotor 4 further transmits power to the sprocket over the overrunning clutch 40 which engages as soon as the speed of the outer rotor 4 exceeds the speed of the sprocket 5. This situation is depicted in FIG. 26. As shown in FIG. 27, the $2^{nd}$ speed is produced when the sprocket is firmly connected to the disc 20 which is obtained by the process of driving the shifting disc 62 in a manner that is identical as described for the previous 2-speed design. The process to disengage the $2^{nd}$ speed is also identical as described for said previous design.

Figure 28:
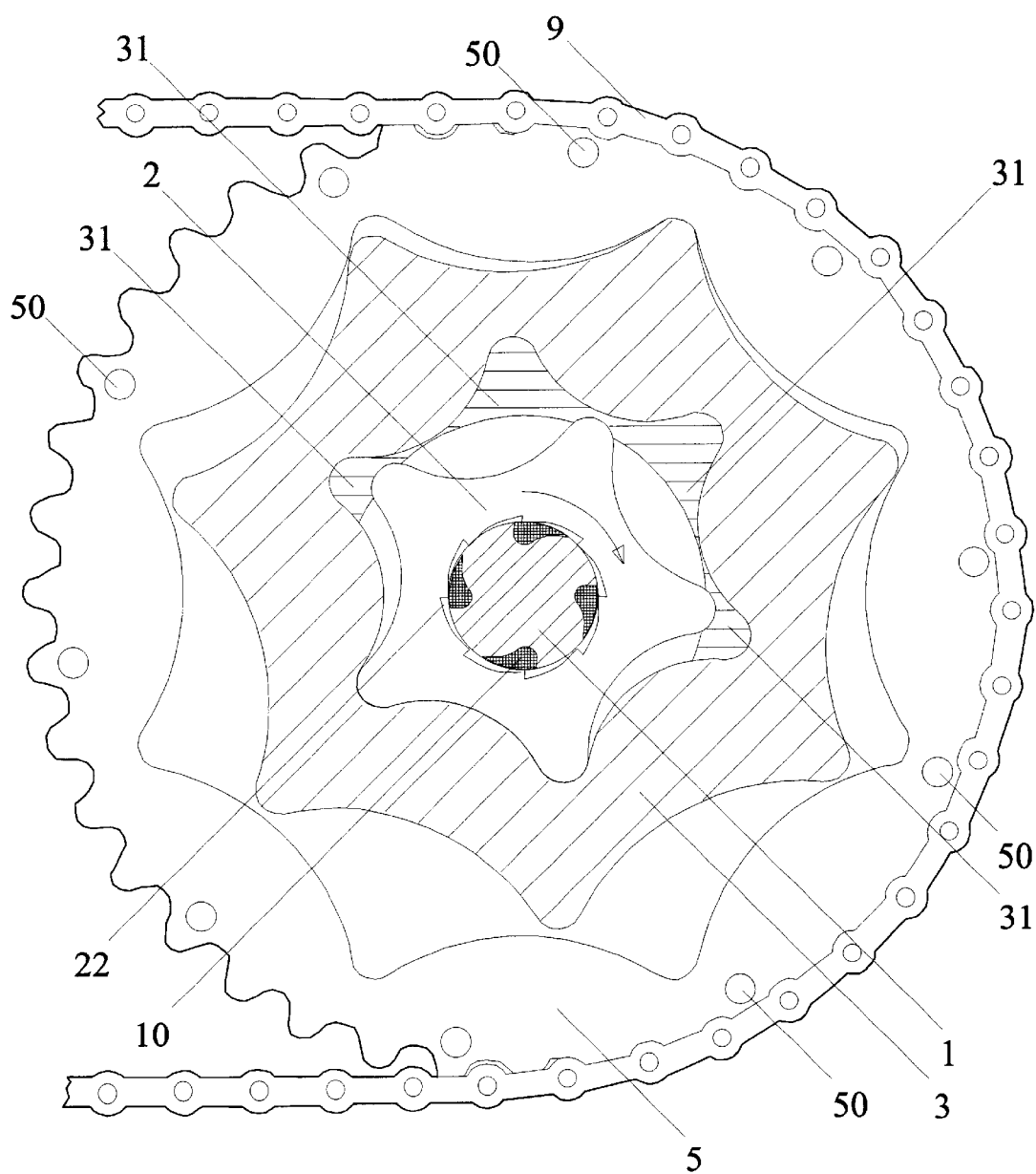
FIG. 28 is a side cut-away view of the rotors' assembly showing the rotors' and sprocket arrangement for the third 2-speed version of the invention wherein the sprocket has a maximum number of teeth and the outer rotor is an integral part of the sprocket.
Figure 29:
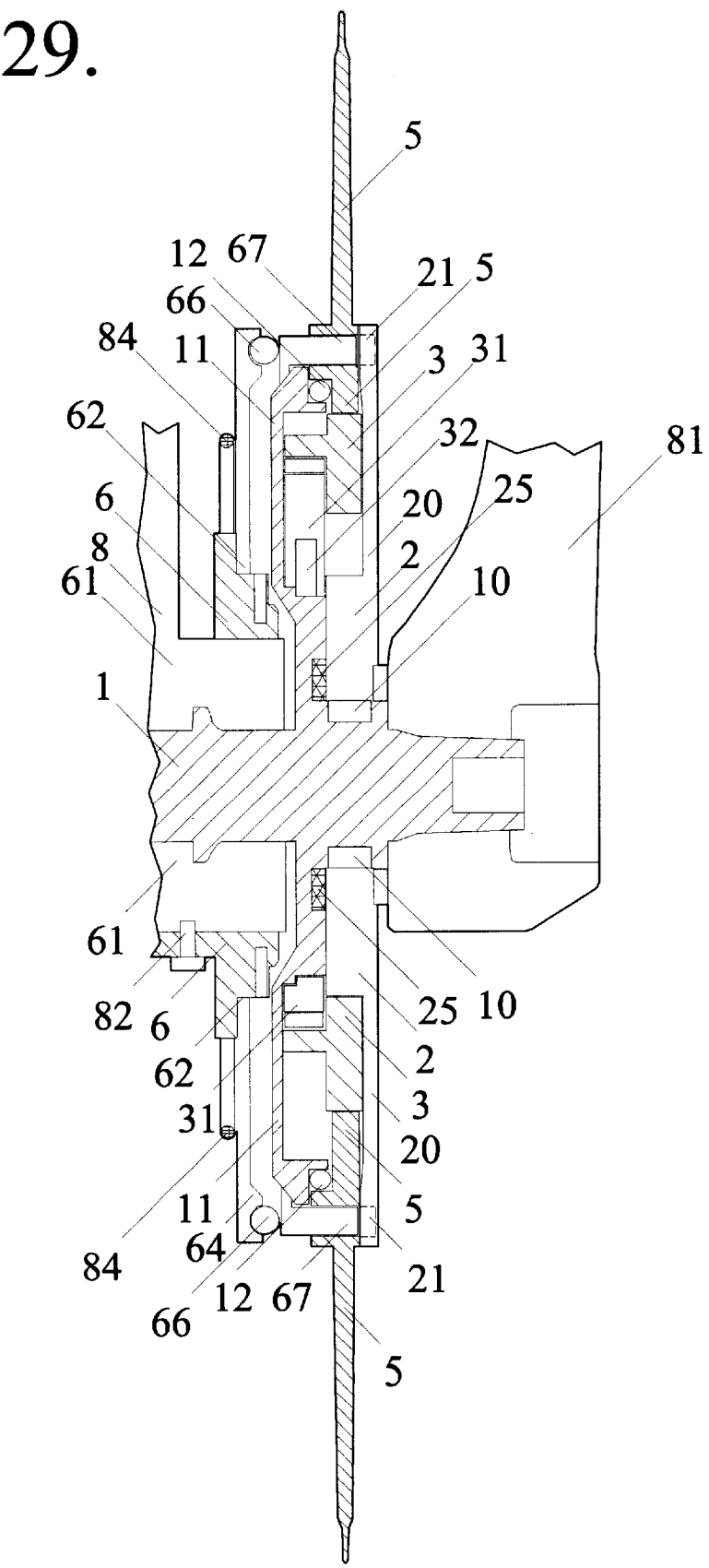
FIG. 29 is a back cut-away view of the invention for the third 2-speed version of the invention in the situation when the $1^{st}$ speed is engaged.
Figure 30:
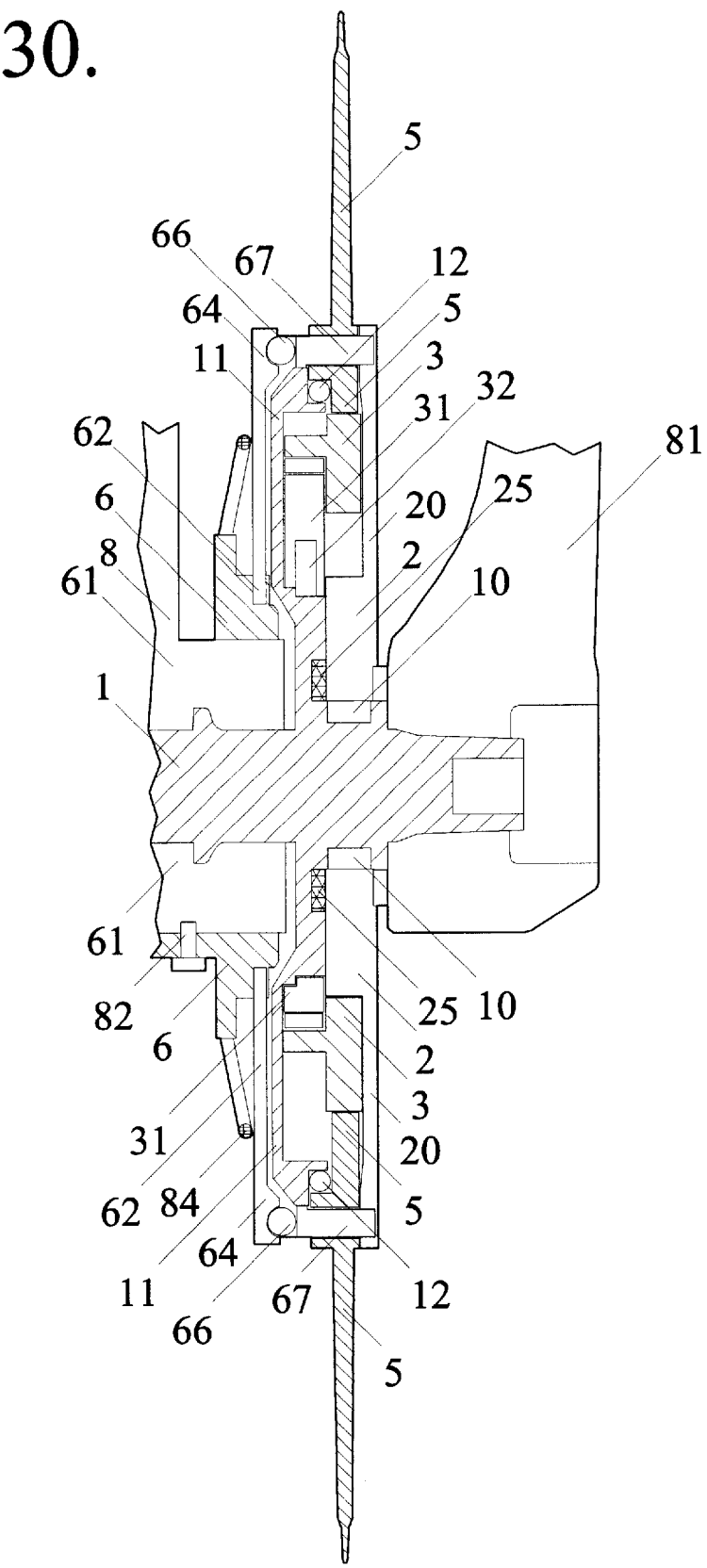
FIG. 30 is a back cut-away view of the invention for the third 2-speed version of the invention in the situation when the $2^{nd}$ speed is engaged.

As shown in FIGS. 28, 29, and 30, the present invention provides yet another design for the 2-speed device wherein the sprocket 5 has the maximum number of teeth. This design comprises the identical rotors' assembly and shifting unit configuration as presented for the previously described design and does not require the overrunning clutch 40. As shown in FIGS. 28, 29, and 30, the sprocket 5 is directly mounted onto the middle rotor 3 and it has the plurality of the lobes receiving pockets provided within its inner circumference. In sum, the sprocket is driven directly by the middle rotor 3 and it rotates on the bearing 12 mounted onto the shaft disc 11.

According to the process of this design, the $1^{st}$ speed is produced when the inner rotor 2 is connected to the shaft 1 over the overrunning clutch 10 and forced to drive the sprocket 5 over the middle rotor 3. The $2^{nd}$ speed is produced when the pins 67 establish the firm connection between the sprocket 5 and the disc 20 which is also obtained by the process of driving the shifting disc 62 in a manner that is identical as described for the previous 2-speed designs. Since the overrunning clutch 40 is eliminate in this design, the entire rotor assembly is locked together and all members rotate together during the $2^{nd}$ speed rotation. The process to disengage the $2^{nd}$ speed is also identical as described for said previous designs.

Figure 31:
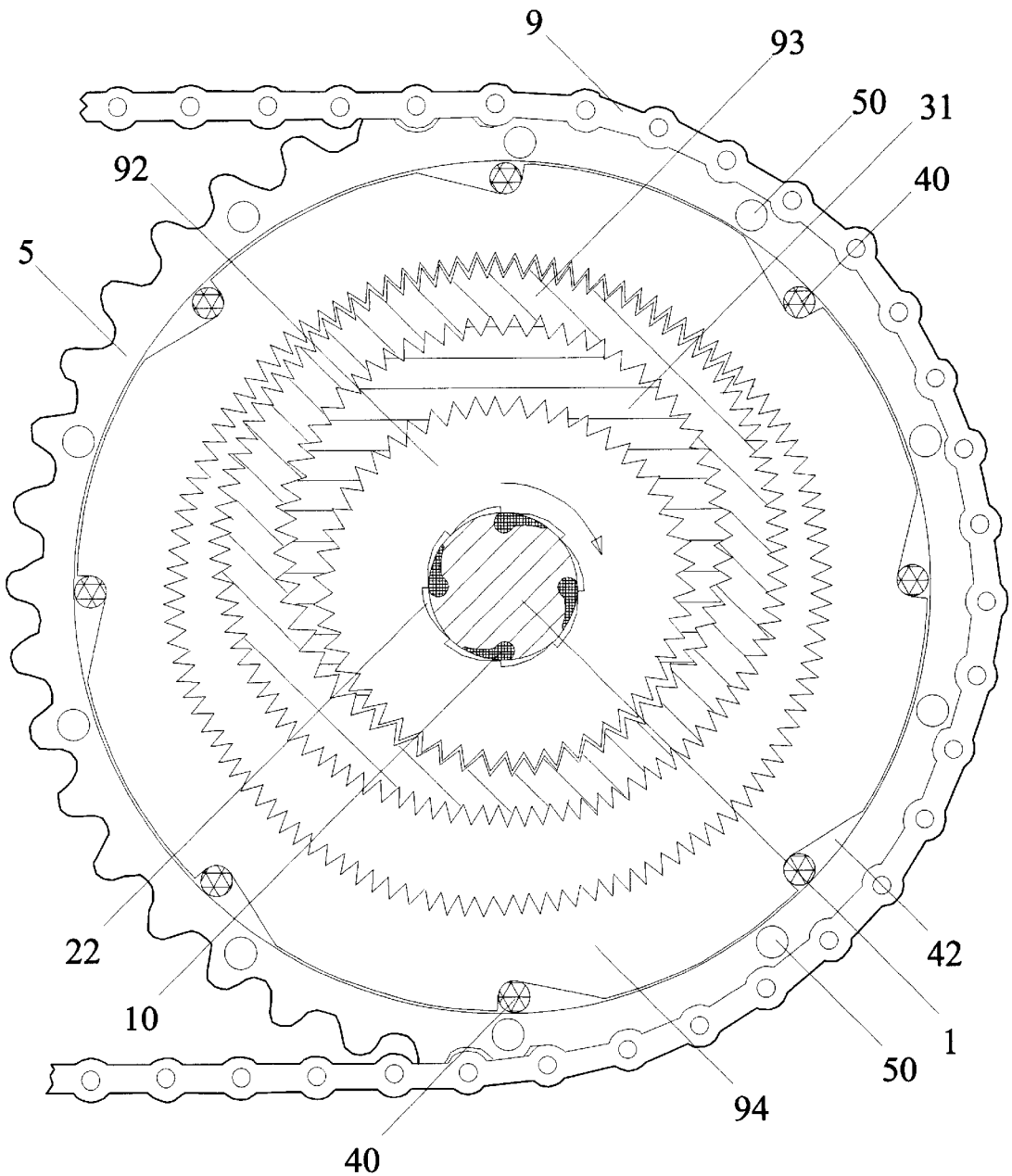
FIG. 31 is a side cutaway view of the invention wherein the gears are used instead of the rotors.

As shown in FIG. 31, the present invention also provides a design wherein the gears 92, 93, and 94 are used instead of the rotors and perform the same functions in the same manner as done by the rotors. The inner gear 92 substitutes the rotor 2, the middle gear 93 substitutes the middle rotor 3, and the outer gear 94 substitutes the rotor 4. This design proposes that all other members and all aspects of the invention are identical as previously described in this specification. It is assumed that this gear-driven design can be applied for all above described designs and that all above described shifting processes are identical as presented in this specification. In sum, the only difference regarding any of the presented designs is that the gears are used instead of the rotors.

While the above is the description of different embodiments of the present invention, various modifications may be employed. Accordingly, the invention should not be limited by the specific described embodiments and the true scope of the invention should be determined from the following claims.

What is claimed is:

1. A device for transmitting power and changing the ratio between a power input shaft operating speed and a power output wheel operating speed, the device comprising:

a power input shaft, the shaft comprising a disc firmly connected to the shaft wherein the disc further comprising a toothed circular surface (gear), a flat circular section, and a plurality of openings;

a first power transmitting member, the power transmitting member rotatably mounted on the shaft and comprising a disc wherein the disc having a plurality of second engaging sections;

a first power connecting means, the first power connecting means located between the power input shaft and the first power transmitting member and providing one-way transmission of power;

a second power transmitting member, the second power transmitting member rotatably mounted on the first power transmitting member and having an circular support section;

a support means, the support means provided between the circular support section in the second power transmitting member and the toothed circular surface (gear) in the disc of the power input shaft;

a plurality of gears, the gears provided within the support means and being in permanent mesh with the toothed circular surface (gear) in the disc of the power input shaft;

a third power transmitting member, the third power transmitting member rotatably mounted on the second power transmitting member and having an extended circular section wherein the extended circular section having a plurality of first engaging sections;

a means for positioning the third power transmitting member, said means located between the flat circular section in the disc of the power input shaft and the extended circular section in the third power transmitting member;

a power output member, the power output member rotatably mounted onto the third power transmitting member and having a plurality of openings extending laterally through the power output member;

a second power connecting means, the second power connecting means located between the third power transmitting member and the power output member and allowing only one-way transmission of power;

a first engaging means, the first engaging means comprising a plurality of first engaging members and located within the plurality of openings in the disc of the power input shaft and proximate to the plurality of first engaging sections in the extended circular section of the third power transmitting member;

a second engaging means, the second engaging means comprising a plurality of second engaging members and located within the plurality of openings in the power output member and proximate to the plurality of second engaging sections in the disc of the first power transmitting member;

a speed shifting means, the speed shifting means comprising a first set of extended section and a second set of extended sections and being connected to a shifting cord;

a means for supporting the speed shifting means, said supporting means firmly attached to a bicycle bottom bracket and being able to rotatably receive the speed shifting means, and having a first plurality of lateral openings and a second plurality of lateral openings;

a plurality of first friction diminishing means, the plurality of first friction diminishing means located within the first plurality of lateral openings in the means for supporting the speed shifting means;

a plurality of second friction diminishing means, the plurality of second friction diminishing means located within the second plurality of lateral openings in the means for supporting the speed shifting means;

a means for operating the speed shifting means, said means connected to the speed shifting means and to the means for supporting the speed shifting means;

a spring for holding the second engaging means.

2. The device of claim 1, wherein the first power connecting means are incorporated within the power input shaft and the first power transmitting member.

3. The device of claim 1, wherein the second power connecting means are incorporated within the third power transmitting member and the power output member.

4. The device of claim 1, wherein a plurality of balls is located within the plurality of openings in the disc of the power input shaft and proximate to the plurality of first engaging sections in the extended circular section of the third power transmitting member thereby substituting for the first engaging members.

5. The device of claim 1, wherein a plurality of balls is rotatably received within the plurality of openings in the power output member between the second engaging members and the second engaging sections in the disc of the first power transmitting member.

6. The device of claim 1, wherein the first engaging members, the first engaging sections, the second engaging members, and the second engaging sections have friction-type surfaces.

7. The device of claim 1, wherein the first power transmitting member, the second power transmitting member are star-shaped rotors and wherein the third power transmitting member has pockets for receiving lobes of the second power transmitting member.

8. The device of claim 1, wherein the first power transmitting member a common (externally toothed) gear, the second power transmitting member is an internally and externally toothed gear, and the third power transmitting member is an internal gear.

9. A transmission for transmitting power and changing the ratio between a power input shaft operating speed and a power output wheel operating speed, the device comprising:

a power input shaft, the shaft comprising a disc wherein the disc further comprising a gear and wherein the disc is an integral part of the shaft;

a first power transmitting member, the power transmitting member rotatably mounted on the shaft and comprising a disc wherein the disc having a plurality of engaging sections and wherein the disc is an integral part of the first power transmitting member;

a second power transmitting member, the second power transmitting member rotatably mounted on the first power transmitting member and having an circular support section, wherein the circular support section is firmly connected to the second power transmitting member;

a support disc, the support disc provided between the circular support section in the second power transmitting member and the gear in the disc of the power input shaft;

a plurality of gears, the gears provided within the support disc and being in permanent mesh with the gear in the disc of the power input shaft;

a third power transmitting member, the third power transmitting member rotatably mounted on the second power transmitting member and being firmly connected to the disc of the power input shaft;

a power output member, the power output member rotatably mounted onto the third power transmitting member and having a plurality of openings extending laterally through the power output member;

a power connecting means, the power connecting means located between the third power transmitting member and the power output member and allowing only one-way transmission of power;

a engaging means, the engaging means comprising a plurality of engaging members and located within the plurality of openings in the power output member and proximate to the plurality of engaging sections in the disc of the first power transmitting member;

a speed shifting means, the speed shifting means comprising a plurality of friction diminishing means and being connected to a shifting cord;

a means for supporting the speed shifting means, said supporting means firmly attached to a bicycle bottom bracket and being able to rotatably receive the speed shifting means, and having a plurality of curved openings for horizontally positioning the speed shifting means:

a means for operating the speed shifting means, said means connected to the speed shifting means and to the means for supporting the speed shifting means;

a spring for holding the engaging means.

10. The device of claim 9, wherein the power connecting means are incorporated within the third power transmitting member and the power output member.

11. The device of claim 9, wherein a plurality of balls is located between the engaging members and the engaging sections in the disc of the first power transmitting member and wherein said balls are rotatably received within the plurality of openings in the power output member.

12. The device of claim 9, wherein the engaging members and the engaging sections have friction-type surfaces.

13. The device of claim 9, wherein the first power transmitting member is a common (externally toothed) gear, the second power transmitting member is an internally and externally toothed gear, and the third power transmitting member an internal gear.

14. A device for transmitting power and changing the ratio between a power input shaft operating speed and a power output wheel operating speed, the device comprising:

a power input shaft, the shaft comprising a disc firmly connected to the shaft wherein the disc further comprising a toothed circular surface (gear) and a flat circular section;

a first power transmitting member, the power transmitting member rotatably mounted on the shaft and comprising a disc wherein the disc having a plurality of engaging sections;

a first power connecting means, the first power connecting means located between the power input shaft and the first power transmitting member and allowing one-way transmission of power;

a second power transmitting member, the second power transmitting member rotatably mounted on the first power transmitting member and incorporating a circular support section;

a support means, the support means provided between the circular support section in the second power transmitting member and the toothed circular surface (gear) in the disc of the power input shaft;

a plurality of gears, the gears provided within the support means and being in permanent mesh with the toothed circular surface (gear) in the disc of the power input shaft;

a third power transmitting member, the third power transmitting member rotatably mounted on the second power transmitting member;

a means for positioning the third power transmitting member, said means located between the flat circular section in the disc of the power input shaft and the third power transmitting member;

a power output member, the power output member rotatably mounted onto the third power transmitting member and having a plurality of openings extending laterally through the power output member;

a second power connecting means, the second power connecting means located between the third power transmitting member and the power output member and providing one-way transmission of power;

an engaging means, the engaging means comprising a plurality of engaging members and located within the plurality of openings in the power output member and proximate to the plurality of engaging sections in the disc of the first power transmitting member;

a speed shifting means, the speed shifting means comprising a plurality of friction diminishing means and being connected to a shifting cord;

a means for supporting the speed shifting means, said supporting means firmly attached to a bicycle bottom bracket and being able to rotatably receive the speed shifting means, and having a plurality of curved openings for horizontally positioning the speed shifting means:

a means for operating the speed shifting means, said means connected to the speed shifting means and to the means for supporting the speed shifting means;

a spring for holding the engaging means.

15. The device of claim 14, wherein the third power transmitting member and the power output member are made as an integral unit mounted onto the second power transmitting member.

16. The device of claim 14, wherein the first power connecting means are incorporated within the power input shaft and the first power transmitting member.

17. The device of claim 14, wherein the second power connecting means are incorporated within the third power transmitting member and the power output member.

18. The device of claim 14, wherein a plurality of balls is rotatably received within the plurality of openings in the power output member between the engaging members and the engaging sections in the disc of the first power transmitting member.

19. The device of claim 14, wherein the first engaging members, the first engaging sections, the second engaging members, and the second engaging sections have friction-type surfaces.

20. The device of claim 14, wherein the first power transmitting member is a common (externally toothed) gear, the second power transmitting member is an internally and externally toothed gear, and the third power transmitting member is an internal gear.

* * * * *